US010966202B2

(12) United States Patent
Jung et al.

(10) Patent No.: US 10,966,202 B2
(45) Date of Patent: *Mar. 30, 2021

(54) WIRELESS COMMUNICATION DEVICE INCLUDING MEMORY DE-ALLOCATOR FOR EFFICIENT MEMORY USAGE AND METHOD OF OPERATING THE SAME

(71) Applicant: Samsung Electronics Co., Ltd., Suwon-si (KR)

(72) Inventors: Young-seok Jung, Suwon-si (KR); Min-goo Kim, Hwaseong-si (KR); In-hyoung Kim, Yongin-si (KR); Joon-sung Kim, Hwaseong-si (KR); Se-bin Im, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,338

(22) Filed: Nov. 8, 2019

(65) Prior Publication Data

US 2020/0077401 A1    Mar. 5, 2020

Related U.S. Application Data

(63) Continuation of application No. 15/869,533, filed on Jan. 12, 2018, now Pat. No. 10,524,264.

(30) Foreign Application Priority Data

Mar. 20, 2017 (KR) .......................... 10-2017-0034926
Jul. 31, 2017 (KR) .......................... 10-2017-0097123

(51) Int. Cl.
*H04W 72/04* (2009.01)
*H04W 72/10* (2009.01)
(Continued)

(52) U.S. Cl.
CPC ......... *H04W 72/0453* (2013.01); *H04L 5/001* (2013.01); *H04W 72/042* (2013.01);
(Continued)

(58) Field of Classification Search
CPC ........... H04W 72/0453; H04W 72/042; H04W 72/10; H04W 16/14; H04W 72/0446; H04L 5/001; H04L 5/0053
See application file for complete search history.

(56) References Cited

U.S. PATENT DOCUMENTS 5,602,836 A    2/1997    Papadopoulos et al.
7,907,686 B2   3/2011    Kim et al.
(Continued)

FOREIGN PATENT DOCUMENTS

KR    2017-0015935 A    2/2017

OTHER PUBLICATIONS

Non-Final Office Action dated Apr. 18, 2019 in U.S. Appl. No. 15/869,533.
(Continued)

*Primary Examiner* — Kevin D Mew
(74) *Attorney, Agent, or Firm* — Harness, Dickey & Pierce, P.L.C.

(57) ABSTRACT

Some example embodiments include methods of operating a wireless communication device supporting carrier aggregation, the methods include allocating a memory of a plurality of memories to each of a plurality of component carriers based on a memory allocation priority; determining a demodulation priority for each of the plurality of component carriers based on one of a size of each memory allocated to each of the plurality of component carriers, and the memory allocation priority; and demodulating signals received via the plurality of component carriers based on the demodulation priority.

20 Claims, 22 Drawing Sheets

(51) Int. Cl.
*H04L 5/00* (2006.01)
*H04W 16/14* (2009.01)

(52) U.S. Cl.
CPC ........... *H04W 72/10* (2013.01); *H04L 5/0053* (2013.01); *H04W 16/14* (2013.01); *H04W 72/0446* (2013.01)

(56) References Cited

U.S. PATENT DOCUMENTS

| | | | |
|---|---|---|---|
| 8,724,742 B2 | 5/2014 | Nimbalker et al. | |
| 9,480,048 B2 | 10/2016 | Earnshaw et al. | |
| 9,577,793 B2 | 2/2017 | Davydov et al. | |
| 2005/0047416 A1* | 3/2005 | Heo | H04W 8/24 370/395.4 |
| 2005/0135312 A1 | 6/2005 | Montojo et al. | |
| 2007/0081498 A1* | 4/2007 | Niwano | H04L 47/10 370/335 |
| 2008/0068999 A1 | 3/2008 | Ishii et al. | |
| 2008/0160942 A1 | 7/2008 | Koyama et al. | |
| 2008/0267312 A1 | 10/2008 | Yokoyama | |
| 2010/0220666 A1 | 9/2010 | Imamura et al. | |
| 2012/0314670 A1 | 12/2012 | Nakajima | |
| 2012/0320853 A1 | 12/2012 | Kwon et al. | |
| 2013/0163540 A1* | 6/2013 | Roh | H04W 72/085 370/329 |
| 2014/0044085 A1 | 2/2014 | Hong | |
| 2015/0003356 A1 | 1/2015 | Seo et al. | |
| 2015/0117291 A1 | 4/2015 | Seo et al. | |
| 2015/0181590 A1 | 6/2015 | Park | |
| 2015/0282178 A1 | 10/2015 | Kim et al. | |
| 2016/0088635 A1 | 3/2016 | Davydov et al. | |
| 2016/0174238 A1* | 6/2016 | Chen | H04W 72/0446 370/336 |
| 2016/0183200 A1 | 6/2016 | Kanamarlapudi et al. | |
| 2016/0241362 A1 | 8/2016 | El-Khamy et al. | |
| 2016/0278072 A1* | 9/2016 | Palle | H04W 72/085 |
| 2017/0013634 A1* | 1/2017 | Tsuboi | H04W 72/10 |
| 2017/0034792 A1 | 2/2017 | Shao et al. | |
| 2018/0219642 A1* | 8/2018 | Fakoorian | H04W 72/10 |
| 2018/0331699 A1* | 11/2018 | Lin | H03M 13/356 |
| 2019/0028185 A1 | 1/2019 | Tomasicchio et al. | |
| 2019/0166625 A1* | 5/2019 | Nam | H04W 72/0446 |

OTHER PUBLICATIONS

Notice of Allowance dated Aug. 7, 2019 in U.S. Appl. No. 15/869,533.

* cited by examiner

|  CC_Name | Rx_Num |
|---|---|
| CC_1 | L |
| CC_2 | M |
| CC_3 | K |

SYNCHRONIZED { CC_1, CC_2, CC_3 }

AT_I

# WIRELESS COMMUNICATION DEVICE INCLUDING MEMORY DE-ALLOCATOR FOR EFFICIENT MEMORY USAGE AND METHOD OF OPERATING THE SAME

CROSS-REFERENCE TO RELATED APPLICATIONS

This application is a Continuation of U.S. application Ser. No. 15/869,533, filed on Jan. 12, 2018, which claims priority under 35 U.S.C. § 119 of Korean Patent Application Nos. 10-2017-0034926, filed on Mar. 20, 2017, and 10-2017-0097123, filed on Jul. 31, 2017, in the Korean Intellectual Property Office, the disclosures of which are incorporated herein in their entirety by reference.

BACKGROUND

Some example embodiments relate to a method of operating a wireless communication device, and more particularly, to a wireless communication device supporting carrier aggregation and a method of operating the wireless communication device.

A carrier aggregation technique for increasing transmission throughput in a wireless communication system is applied. As the number of component carriers used for carrier aggregation increases, the size of a memory for storing signals (or data) received via the component carriers also increases. In particular, in long term evolution (LTE), since a physical layer decodes the received signals (or received data) within a specific time in order to support automatic repeat request (ARQ), the size of the memory is increased for storing the received data as well as the speed of data processing blocks. Accordingly, a method of reducing a degree of increase in the size of the memory by efficiently using the memory would be desirable.

SUMMARY

Some example embodiments provide a method of operating a wireless communication device supporting carrier aggregation in which each of a plurality of component carriers is allocated to memories and received signals are processed by using allocated memories, so that efficient memory usage is performed.

According to some example embodiments, there is provided a method of operating a wireless communication device supporting carrier aggregation, the method may include allocating a memory of a plurality of memories to each of a plurality of component carriers based on a memory allocation priority. The method may further include determining a demodulation priority for each of the plurality of component carriers based on one of a size of each memory allocated to each of the plurality of component carriers, and the memory allocation priority. Furthermore, the method may include demodulating signals received via the plurality of component carriers based on the demodulation priority.

According some example embodiments, there is provided a method of operating a wireless communication device supporting carrier aggregation, wherein the wireless communication device transmits and receives signals using a plurality of component carriers, a first component carrier group includes a first component carrier and a second component carrier of the plurality of component carriers, the second component carrier being synchronized with the first component carrier, and a second component carrier group includes a third component carrier of the plurality of component carriers, the third component carrier being un-synchronized with the first component carrier, the method may include allocating a memory of a plurality of memories to each of the plurality of component carriers based on a first memory allocation priority among the first component carrier group and the second component carrier group, and a second memory allocation priority within each of the first component carrier group and the second component carrier group. Furthermore, the method may include demodulating signals received via the plurality of component carriers based on a demodulation priority determined based on one of a result of the allocating for each of the plurality of component carriers or a number of reception antennas used to receive each of the plurality of component carriers.

According some example embodiments, there is provided a wireless communication device including a plurality of reception antennas for receiving signals from a plurality of component carriers. The device may further include a plurality of memories respectively allocated to the plurality of component carriers, the plurality of memories having at least two sizes, at least one of the plurality of memories storing computer-readable instructions. Furthermore, the device may include a data processor communicatively coupled to the plurality of memories and configured to execute the computer-readable instructions to allocate at least one of the plurality of memories to each of the plurality of component carriers based on a memory allocation priority determined based on a number of the plurality of reception antennas used to receive each of the plurality of component carriers.

BRIEF DESCRIPTION OF THE DRAWINGS

Some example embodiments will be more clearly understood from the following detailed description taken in conjunction with the accompanying drawings in which.

DETAILED DESCRIPTION

Hereinafter, some example embodiments will be described in detail with reference to the accompanying drawings.

Figure 1A:
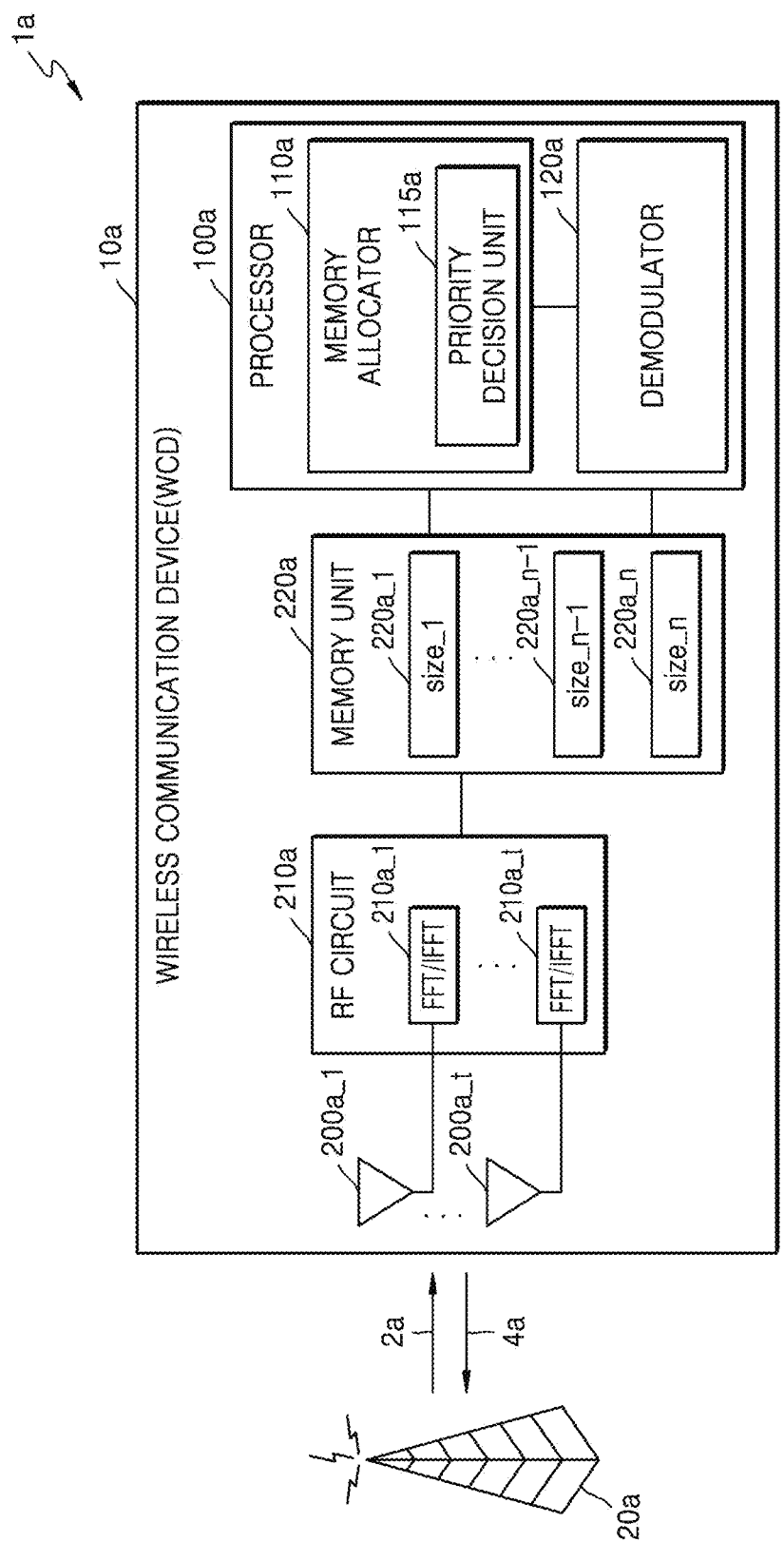
FIGS. 1A and 1B are block diagrams illustrating wireless communication systems respectively including a wireless communication device and a base station according to some example embodiments.

FIG. 1A is a block diagram of a wireless communication system 1a including a wireless communication device (WCD) 10a and a base station 20a according to some example embodiments.

Referring to FIG. 1A, the wireless communication system 1a may include the WCD 10a and the base station 20a that may communicate with each other via a downlink channel 2a and an uplink channel 4a. The WCD 10a may include a plurality of antennas 200a_1 through 200a_t, a radio frequency (RF) circuit 210a, a memory unit 220a, and a processor 100a. Each of the components included in the WCD 10a (e.g., the fast Fourier transform (FFT)/inverse FFT (IFFT) blocks 210a_1 through 210a_t, the analog down-conversion mixer, the memory allocator 110a, the demodulator 120a, the priority decision unit 115a, and the decoder, discussed further below) may be a hardware block including analog circuitry and/or digital circuitry, and/or may be a software block including a plurality of instructions stored in a memory (e.g., the memory unit 220a) and executed by a processor (e.g., the processor 100a), or the like. According to some example embodiments, the memory may be a non-transitory computer-readable medium.

The term 'processor', as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

In some example embodiments, the memory may include a read only memory (ROM), programmable read only memory (PROM), electrically programmable ROM (EPROM), electrically erasable programmable ROM (EEPROM), flash memory, random access memory (RAM), dynamic RAM (DRAM), static RAM (SRAM), and/or synchronous RAM (SDRAM). However, these are only some example embodiments and one of ordinary skill in the art would understand that any memory that stores computer-readable instructions may be used.

The WCD 10a may be various devices that may communicate with the base station 20a to transmit and/or receive data signals and/or control information. For example, the WCD 10a may be referred to as user equipment (UE), a mobile station (MS), a mobile terminal (MT), a user terminal (UT), a subscriber station (SS), a mobile device, or the like. The base station 20a may be a fixed station that communicates with the WCD 10a and/or other base stations, to transmit and/or receive the data signals and/or the control information. The base station 20a may be referred to as a Node B, an evolved Node B (eNB), a base transceiver system (BTS), an access point (AP), or the like.

A wireless communication network between the WCD 10a and the base station 20a may support communication of multiple users by sharing available network resources. For example, in the wireless communication network, information may be transmitted via various methods such as code division multiple access (CDMA), frequency division multiple access (FDMA), time division multiple access (TDMA), orthogonal frequency division multiple access (OFDMA), and single carrier frequency division multiple access (SC-FDMA). In addition, the WCD 10a and the base station 20a may support a carrier aggregation communication method capable of transmitting and receiving the data signals and/or the control information via a plurality of component carriers.

The RF circuit 210a may receive the control information and/or the data signals included in the plurality of component carriers from the base station 20a via the plurality of antennas 200a_1 through 200a_t. In some example embodiments, the number of reception antennas used for receiving each of component carriers may be different. The RF circuit 210a may include fast Fourier transform (FFT)/inverse FFT (IFFT) blocks 210a_1 through 210a_t that are capable of performing time-frequency conversion on a received signal and/or frequency-time conversion on a transmitted signal. Furthermore, the RF circuitry 210a may include an analog down-conversion mixer and may generate a baseband signal by down-converting a frequency of the received signal (or data signal).

The memory unit 220a may include a plurality of first to nth memories 220a_1 through 220a_n having various sizes. In some example embodiments, the plurality of first to nth memories 220a_1 through 220a_n (including, e.g., memories 220a_1, 220a_n−1 and 220a_n) included in the memory unit 220a may be physically different memories from each other, and may be memories formed by logically dividing a single memory region and having different sizes. The plurality of memories first to nth 220a_1 through 220a_n may store signals received via the plurality of component carriers. In other words, the memory unit 220a may perform a buffering operation for processing smoothly the received signals. A configuration of the memory unit 220a illustrated in FIG. 1A corresponds to some example embodiments and is not limited thereto, and the memory unit 220a may also include at least two memories having the same or similar size.

The processor 100a may include a memory allocator 110a and a demodulator 120a. The processor 100a may perform an operation of processing the received signals stored in the memory unit 220a based on the control information received from the base station 20a. The memory allocator 110a may allocate the first to nth memories 220*a*_1 through 220*a*_*n* to each of the component carriers based on the memory allocation priority for the plurality of component carriers. In other words, each of the first to nth memories 220*a*_1 to 220*a*_*n* may store signals received via respective component carriers allocated by the memory allocator 110*a*. For example, the memory allocator 110*a* may allocate a first component carrier to the first memory 220*a*_1 having a first size size_1 and the first memory 220*a*_1 may store a signal received via the first component carrier.

In some example embodiments, the memory allocator 110*a* may include a priority decision unit 115*a*. The priority decision unit 115*a* may first determine the memory allocation priority and then, determine a demodulation priority, or the like to be described below. The priority decision unit 115*a* may determine the memory allocation priority based on the number of reception antennas used for carrier reception for each of the component carriers. For example, when the WCD 10*a* receives the data signal or the like via the first and the second component carriers, the priority decision unit 115*a* may determine the memory allocation priority by comparing the number of reception antennas used for receiving the first component carrier to the number of reception antennas used for receiving the second component carrier. However, some example embodiments are not limited thereto. The priority decision unit 115*a* may determine the memory allocation priority based on the control information received from each of the component carriers. For example, the control information may include downlink scheduling result information of the base station 20*a* and the priority decision unit 115*a* may determine the memory allocation priority by using the downlink scheduling result information.

In some example embodiments, the memory allocator 110*a* may enumerate the plurality of first to nth memories 220*a*_1 through 220*a*_*n* of the memory unit 220*a* in ascending order of size and allocate the result thereof to the component carriers in order of the memory allocation priority. In other words, the memory allocator 110*a* may allocate the smallest memory to a component carrier having the highest memory allocation priority. Although the memory allocator 110*a* has been described mainly with respect to an operation of allocating the first to nth memories 220*a*_1 through 220*a*_*n* to the component carriers, some example embodiments are not limited thereto. The memory allocator 110*a* may perform an operation of de-allocating the first to nth memories 220*a*_1 through 220*a*_*n* allocated to the component carriers. The memory allocator 110*a* may perform operations of allocating and de-allocating memories in real time for efficient memory usage. For example, a memory may be used more efficiently by determining a demodulation priority based on parameters associated with memory utilization, such as allocated memory size and memory allocation priority.

The demodulator 120*a* may perform a demodulation operation by using the first to nth memories 220*a*_1 through 220*a*_*n* which are allocated to each of the component carriers by the memory allocator 110*a* and may store the received signals. In some example embodiments, the demodulator 120*a* may demodulate the received signals stored in the memory unit 220*a* based on the demodulation priority for the plurality of component carriers. The priority decision unit 115*a* may determine the demodulation priority based on any one of the size of the memory allocated to each of the component carriers and the memory allocation priority. The priority decision unit 115*a* may determine the demodulation priority based on a size of a memory actually allocated to each of the component carriers by the memory allocator 110*a*, or determine the demodulation priority based on the memory allocation priority. For example, the priority decision unit 115*a* may determine the demodulation priority to be higher for a component carrier having a smaller size of the memory actually allocated thereto. However, when a portion or a plurality of component carriers are allocated to memories of the same size and it is difficult to determine the demodulation priority based on an allocated memory size, the demodulation priority may be determined based on the memory allocation priority (or, the number of reception antennas used for receiving each of the component carriers). For example, the priority decision unit 115*a* may determine the demodulation priority to be higher for a component carrier having a higher memory allocation priority. The demodulator 120*a* may demodulate the received signal stored in the memory unit 220*a* based on the demodulation priority determined in the above manner. For example, the processor 100*a* may first allocate a small-sized memory to a component carrier having a large number of reception antennas used for carrier reception, and selectively demodulate a signal received from the component carrier to which the small-sized memory is allocated, thereby generating an effect that memory use for the memory unit 220*a* may be efficiently performed. However, the demodulator 120*a* may perform demodulation for received signals of component carriers having the same demodulation priority in a first in, first out (FIFO) method. Although not shown in FIG. 1A, the processor 100*a* may further include a functional block that decodes demodulated, received signals.

Figure 1B:
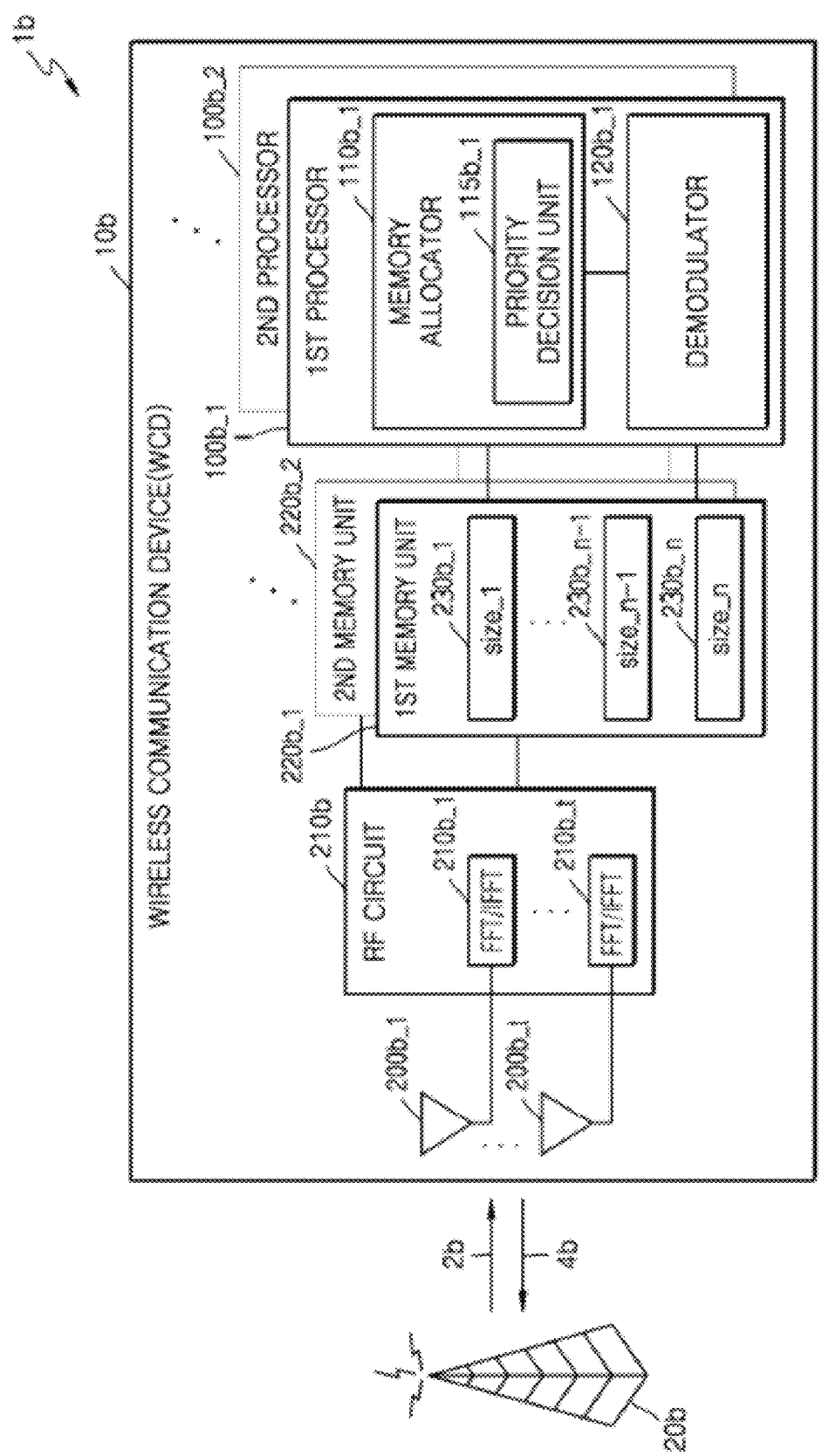

FIG. 1A shows an example of a configuration of the WCD 10*a* in which one processor 100*a* processes signals received from the plurality of component carriers. FIG. 1B is a block diagram of a wireless communication system 1*b* including a wireless communication device (WCD) 10*b* and a base station 20*b* according to some example embodiments. FIG. 1B shows an example of a configuration of a WCD 10*b* in which a plurality of processors 100*b*_1, 100*b*_2, . . . process signals received from the plurality of component carriers. According to some example embodiments, the wireless communication system 1*b* includes a similar or the same description as some example embodiments associated with FIG. 1A. Redundant descriptions between FIGS. 1A and 1B may be omitted.

Referring to FIG. 1B, the WCD 10*b* may include a plurality of reception antennas 200*b*_1 through 200*b*_*t*, an RF circuit 210*b*, a plurality of memory units 220*b*_1, 220*b*_2, . . . , and a plurality of processors 100*b*_1, 100*b*_2, . . . . The processors 100*b*_1, 100*b*_2, . . . may perform an operation of processing signals received via a plurality of component carriers by using the memory units 220*b*_1, 220*b*_2, . . . respectively connected thereto. In some example embodiments, the plurality of processors 100*b*_1, 100*b*_2, . . . may respectively process signals received via a portion of component carriers among the plurality of component carriers received by the WCD 10*b*. For example, the first processor 100*b*_1 may process signals received from a first through nth component carriers, and the second processor 100*b*_2 may process signals received from a $(n+1)^{th}$ through $m^{th}$ component carriers. Each of the processors 100*b*_1 and 100*b*_2 may perform a processing operation based on the memory allocation priority and the demodulation priority, like the processor 100*a* described with reference to FIG. 1A. As discussed above, the downlink channel 2*b*, the uplink channel 4*b*, the FFT/IFFT blocks 210*b*_1 through 210*b*_*t*, the plurality of first to nth memories 230*b*_1 through 230*b*_*n* (including, e.g., memories 230*b*_1, 230b_n−1 and 230b_n) included in each respective memory unit 220b_1, 230b_2, . . . , and/or the memory allocator 110b_1, the priority decision unit 115b_1, and/or the demodulator 120b_1 included in each respective processor 100b_1 and/or 100b_2 may be the same as or similar to the downlink channel 2a, the uplink channel 4a, the FFT/IFFT blocks 210a_1 through 210a_t, the plurality of first to nth memories 220a_1 through 220a_n, the memory allocator 110a, the priority decision unit 115a, and/or the demodulator 120a. Redundant descriptions between FIGS. 1A and 1B may be omitted.

Figure 2A:
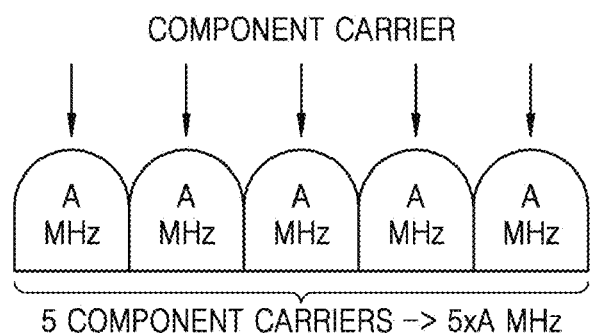
FIG. 2A shows an example of carrier aggregation supported by the wireless communication system of FIGS. 1A and 1B.
Figure 2B:
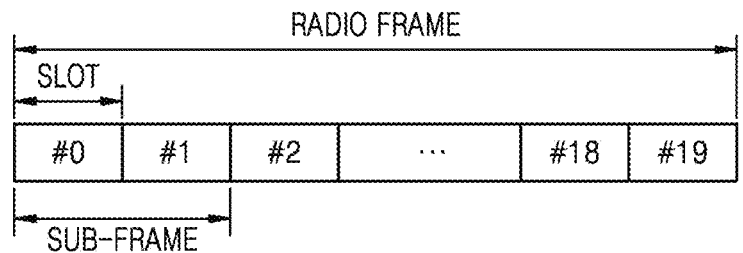
FIG. 2B shows a radio frame structure of a signal transmitted and received between the wireless communication device and the base station of FIGS. 1A and 1B.
Figure 2C:
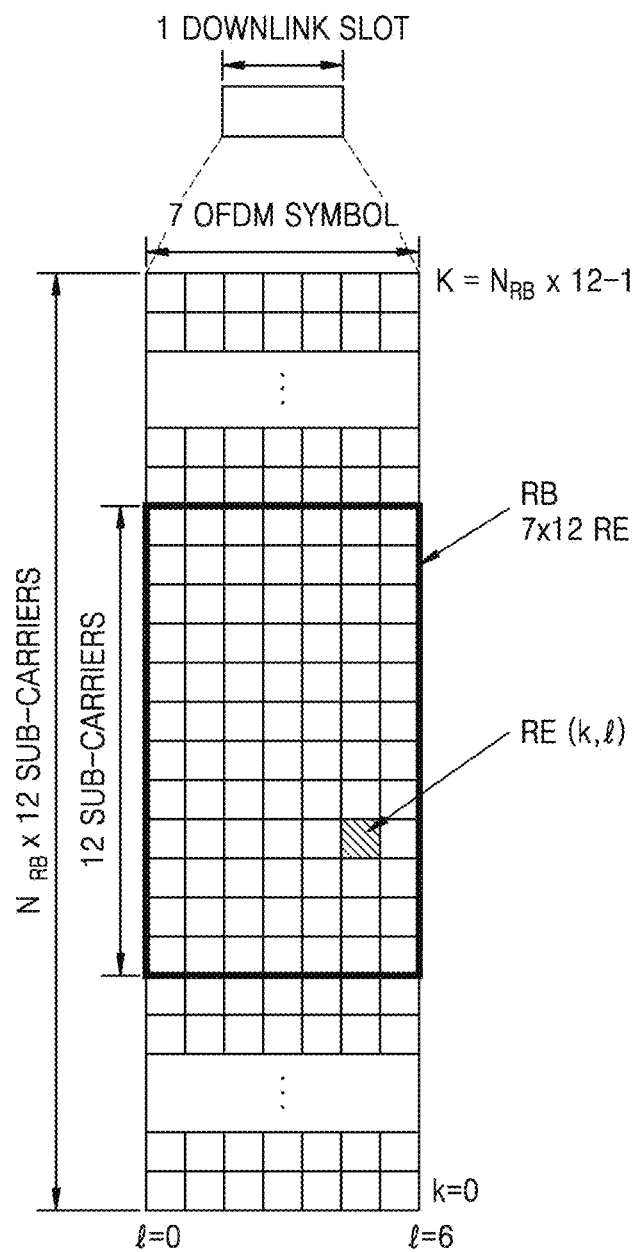
FIG. 2C shows a resource grid for a downlink slot.

FIG. 2A illustrates an example of carrier aggregation supported by the wireless communication systems 1a and 1b of FIGS. 1A and 1B, respectively. FIG. 2B illustrates a radio frame structure of a signal transmitted and received between the wireless communication device 10a and the base station 20a in FIG. 1A. FIG. 2C illustrates a resource grid for a downlink slot in FIG. 1A.

The wireless communication systems 1a and 1b of FIGS. 1A and 1B, respectively, may support carrier aggregation. Referring to FIG. 2A, each component carrier may have a bandwidth of A MHz, and five consecutive component carriers or more may be integrated. Accordingly, the wireless communication systems 1a and 1b may be configured to have a maximum bandwidth of 5×A MHz or more. In addition, the wireless communication systems 1a and 1b may support carrier aggregation for non-consecutive component carriers, unlike illustrated in FIG. 2A.

FIG. 2B shows a structure of a radio frame for transmission/reception signals between the WCDs 10a and 10b and base stations 20a and 20b in FIGS. 1A and 1B, respectively. Referring to FIG. 2B, the radio frame may include ten sub-frames and one sub-frame may include two slots in a time domain. A time for transmitting one sub-frame may be defined as a transmission time interval (TTI). The TTI may be a scheduling unit for transmission of a data signal. For example, a length of one radio frame may be about 10 ms, a length of one sub-frame may be about 1 ms, and a length of one slot may be about 0.5 ms. One slot may include a plurality of orthogonal frequency division multiplexing (OFDM) symbols in the time domain and may include a plurality of sub-carriers in a frequency domain.

FIG. 2C illustrates the resource grid for a downlink slot. Referring to FIG. 2C, the downlink slot may include a plurality of OFDM symbols in the time domain. For example, one downlink slot may include seven OFDM symbols and one resource block (RB) may include twelve sub-carriers in the frequency domain. However, the present disclosure is not limited thereto. Each element of the resource grid may be referred to as a resource element (RE). One RB may include a plurality of REs (for example, 12×7 REs). The number of RBs, that is, $N_{RB}$, included in the downlink slot may depend on a downlink transmission bandwidth.

Figure 3A:
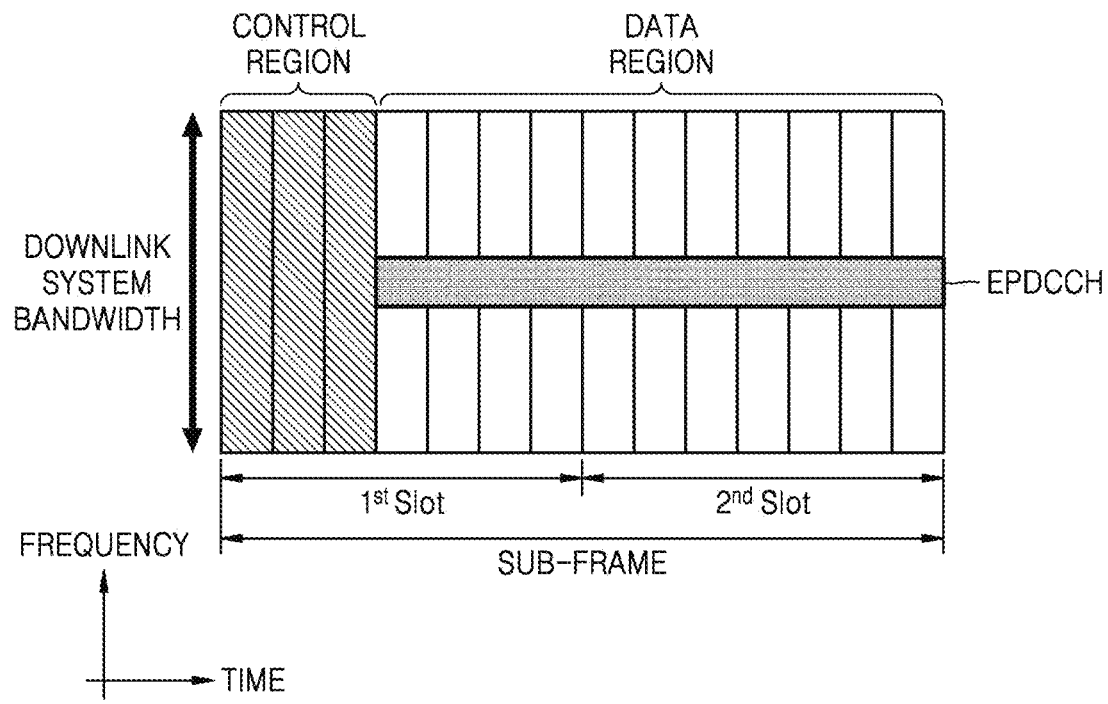
FIGS. 3A and 3B are diagrams illustrating a structure of a downlink sub-frame.
Figure 3B:
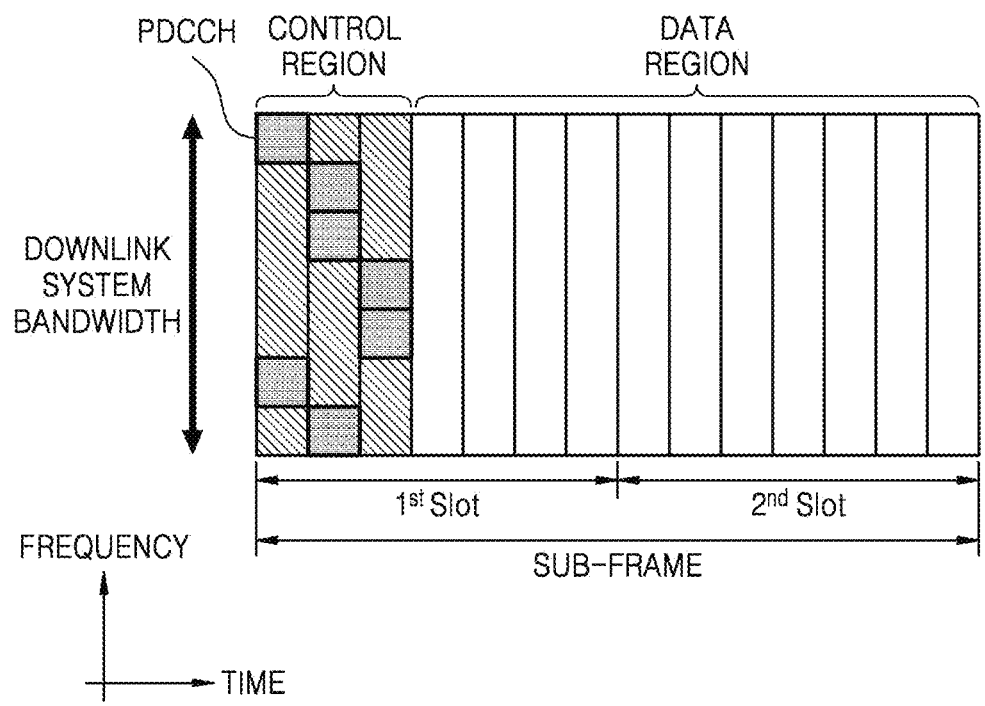

FIGS. 3A and 3B are diagrams illustrating a structure of a downlink sub-frame.

Referring to FIG. 3A, a maximum of three OFDM symbols located in a front portion of a first slot in the sub-frame may correspond to a control region allocated as a control channel for transmitting the control information. Other remaining OFDM symbols may correspond to a data region allocated as a physical downlink shared channel (PDSCH). Examples of downlink control channels may include a physical control format indicator channel (PCFICH), a physical hybrid automatic repeat request (HARQ), a HARQ indicator channel (PHICH), a physical downlink control channel (PDCCH), an enhanced physical downlink control channel (EPDCCH), or the like. In the sub-frame shown in FIG. 3A, the EPDCCH may be located in a portion of the downlink system bandwidth of a downlink system of the data region. In the sub-frame shown in FIG. 3B, the PDCCH, instead of the EPDCCH, may be located over a whole downlink system bandwidth of the control region.

The PCFICH carries information about the number of OFDM symbols that are transmitted from a first OFDM symbol of the sub-frame and used for transmission of the control channels in the sub-frame. The PHICH may be a response to an uplink transmission and carry HARQ acknowledgment (ACK)/non-ACK (NACK) signals. The control information transmitted via the PDCCH or the EPDCCH may be referred to as downlink control information (DCI). The DCI may include uplink or downlink scheduling information or uplink transmission (Tx) power control commands for any arbitrary WCD groups. The PDCCH or the EPDCCH may carry a resource allocation and a transmission format of downlink shared channel (DL-SCH), resource allocation information of uplink shared channel (UL-SCH), paging information on the paging channel (PCH), system information on the DL-SCH, resource allocation of upper layer control messages such as random access response transmitted on the PDSCH, a collection of transmission power control commands for individual WCDs in any arbitrary WCD group, activation of voice over internet protocol (VoIP), or the like.

The PDCCH or the EPDCCH may be transmitted via one or several consecutive aggregations of control channel elements (CCEs). The CCE may be a logical allocation unit used to provide a coding rate to the PDCCH or the EPDCCH based on a state of a radio channel. The CCE may correspond to a plurality of resource element groups. Hereinafter, some example embodiments will be described based on descriptions given with reference to FIGS. 2A through 3B.

Figure 4:
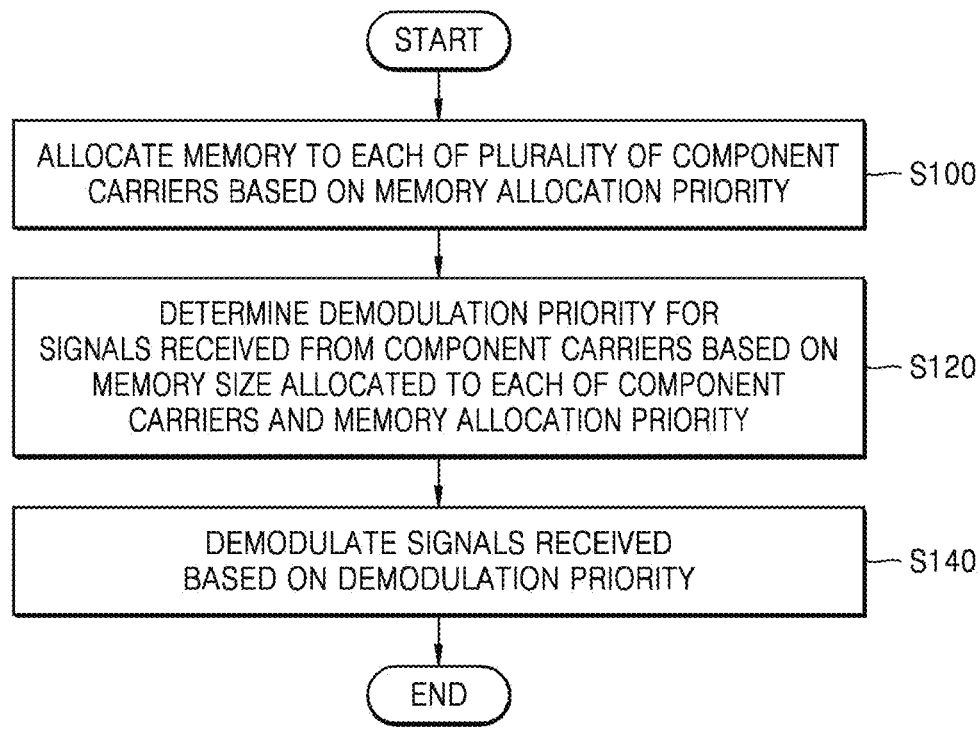
FIG. 4 is a flowchart illustrating a method of operating a wireless communication device to demodulate received signals, according to some example embodiments.

FIG. 4 is a flowchart illustrating a method of operating a WCD to demodulate received signals, according to some example embodiments.

Referring to FIG. 4, the WCD may allocate a memory to each of a plurality of component carriers received from a base station based on a memory allocation priority for the component carriers (S100). Next, the WCD may determine a demodulation priority for signals received from the component carriers based on a memory size allocated to each of the component carriers and the memory allocation priority (S120). The WCD may demodulate the signals received via the component carriers based on the determined demodulation priority (S140).

Figure 5:
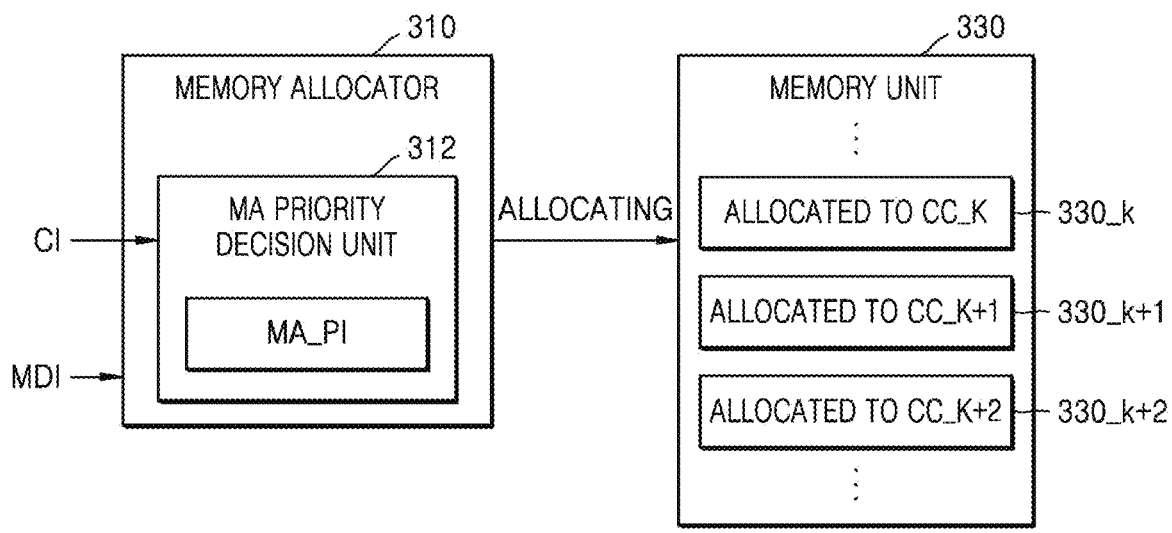
FIG. 5 is a block diagram illustrating a detailed method of determining memory allocation priority using a memory allocation priority decision unit included in a memory allocator.

FIG. 5 is a block diagram illustrating a detailed method of determining the memory allocation priority using a memory allocation (MA) priority decision unit 312 included in a memory allocator 310.

Referring to FIG. 5, the memory allocator 310 may include the MA priority decision unit 312, and the MA priority decision unit 312 may receive the control information CI via each of the plurality of component carriers. The MA priority decision unit 312 may obtain information related with the number of the reception antennas used for receiving each of the component carriers by using the control information CI. The MA priority decision unit 312 may generate memory allocation priority information MA_PI based on the information related with the number of the reception antennas. For example, the MA priority decision unit 312 may determine the memory allocation priority to be higher as the number of reception antennas used for carrier reception increases. According to some example embodiments, the memory allocation priority information MA_PI is used to determine the demodulation priority when two or more component carriers are allocated the same size of memory.

The memory allocator 310 may perform memory allocation for each of the component carriers based on the memory allocation priority information MA_PI. A memory unit 330 may include a plurality of memories 330_k, 330_k+1, . . . (for example, memories 330_k, 330_k+1 and/or 330_k+2) that have various sizes. The memory allocator 310 may receive memory division information MDI indicating a size of each of the memories 330_k, 330_k+1, . . . . The memory allocator 310 may enumerate the memories 330_k, 330_k+1, . . . in order of decreasing size by using the memory division information MDI, and then, allocate the component carriers to respective memories 330_k, 330_k+1, . . . in order of increasing memory allocation priority. For example, in a scenario in which memory 330_k has the largest size, memory 330_k+2 has the smallest size, a CC_$K^{th}$ component carrier has the lowest memory allocation priority, and a (CC_K+2)$^{th}$ component carrier has the highest memory allocation priority, the memory allocator 310 may allocate a CC_$K^{th}$ component carrier to the $k^{th}$ memory 330_k, allocate a (CC_K+1)$^{th}$ component carrier to a $(k+1)^{th}$ memory 330_k+1, and allocate a (CC_K+2)$^{th}$ component carrier to a $(k+2)^{th}$ memory 330_k+2. Accordingly, the $k^{th}$ memory 330_k may store a received signal (control information or data signal) received via the CC_$K^{th}$ component carrier, the $(k+1)^{th}$ memory 330_k+1 may store a received signal received via the (CC_K+1)$^{th}$ component carrier, and the $(k+2)^{th}$ memory 330_k+2 may store a received signal received via the (CC_K+2)$^{th}$ component carrier.

Figure 6:
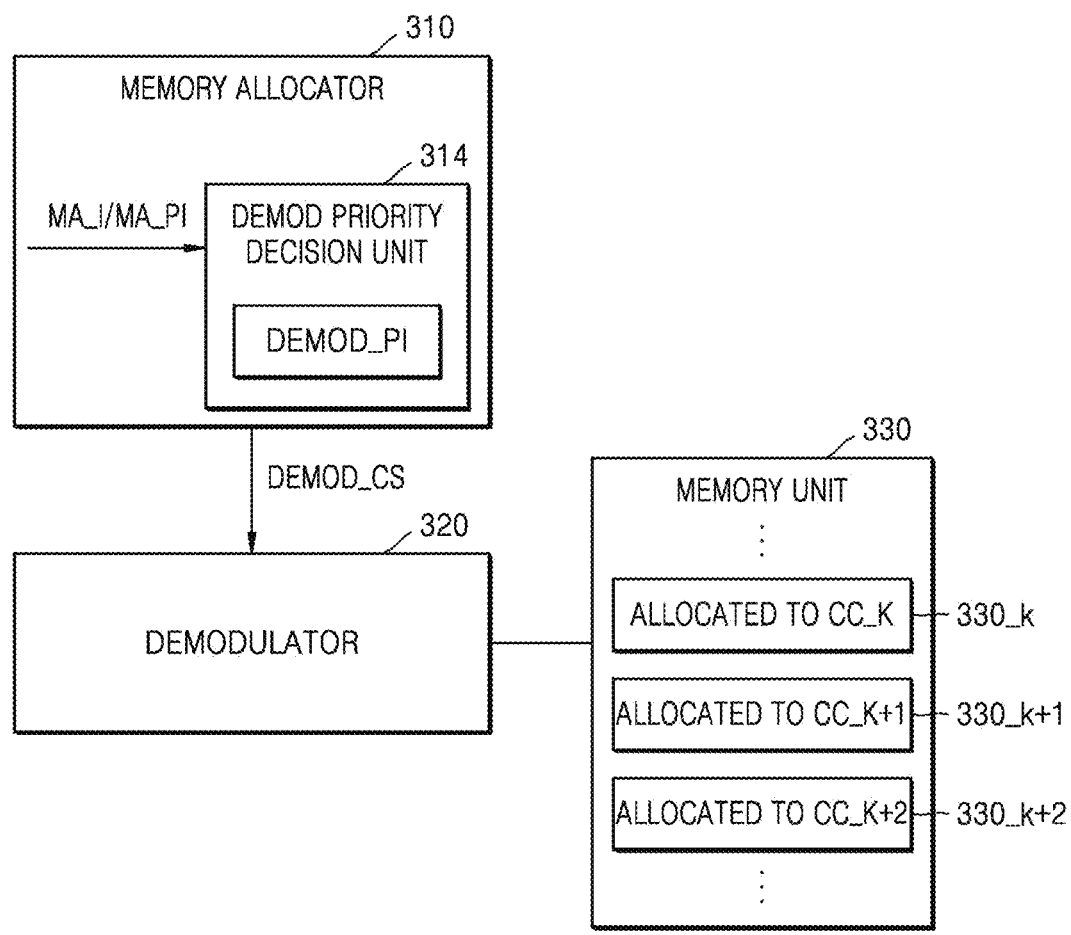
FIG. 6 is a block diagram illustrating a detailed method of determining demodulation priority using a demodulation priority decision unit included in the memory allocator.

FIG. 6 is a block diagram illustrating a detailed method of determining the demodulation priority using a demodulation priority decision unit 314 included in the memory allocator 310.

Referring to FIG. 6, the memory allocator 310 may further include the demodulation priority decision unit 314. The demodulation priority decision unit 314 may generate a demodulation priority information DEMOD_PI, based on any one of information indicating which memory of memories 330_k, 330_k+1, . . . (for example, memories 330_k, 330_k+1 and/or 330_k+2) is actually allocated to which of the component carriers (hereinafter, referred to as memory allocation information, MA_I) and the memory allocation priority information MA_PI generated by the MA priority decision unit 312, as discussed in FIG. 5.

Firstly, the demodulation priority decision unit 314 may generate the demodulation priority information DEMOD_PI by using the memory allocation information MA_I. The demodulation priority decision unit 314 may determine the demodulation priority to be higher for a component carrier having a smaller size of a memory actually allocated thereto. However, when sizes of memories actually allocated to at least a portion of the component carriers are the same, the demodulation priority decision unit 314 may determine the demodulation priority for the component carriers based on the memory allocation priority information MA_PI. For example, when CC_$K^{th}$ through (CC_K+2)$^{th}$ component carriers are allocated to memories 330_k through 330_k+2 of the same size, the demodulation priority decision unit 314 may refer to the memory allocation priority information MA_PI to determine the demodulation priority for the CC_$K^{th}$ through (CC_K+2)$^{th}$ component carriers. As a result, the demodulation priority decision unit 314 may determine the demodulation priority for the CC_$K^{th}$ through (CC_K+2)$^{th}$ component carriers, like the memory allocation priority information MA_PI.

The memory allocator 310 may generate a demodulation control signal DEMOD_CS based on the demodulation priority information DEMOD_PI and provide the demodulation control signal DEMOD_CS to a demodulator 320. The demodulator 320 may perform a demodulation operation by using the received signals stored in the memory unit 330 according to the demodulation priority for each of component carriers based on the demodulation control signal DEMOD_CS.

Figures 7A, 7B:
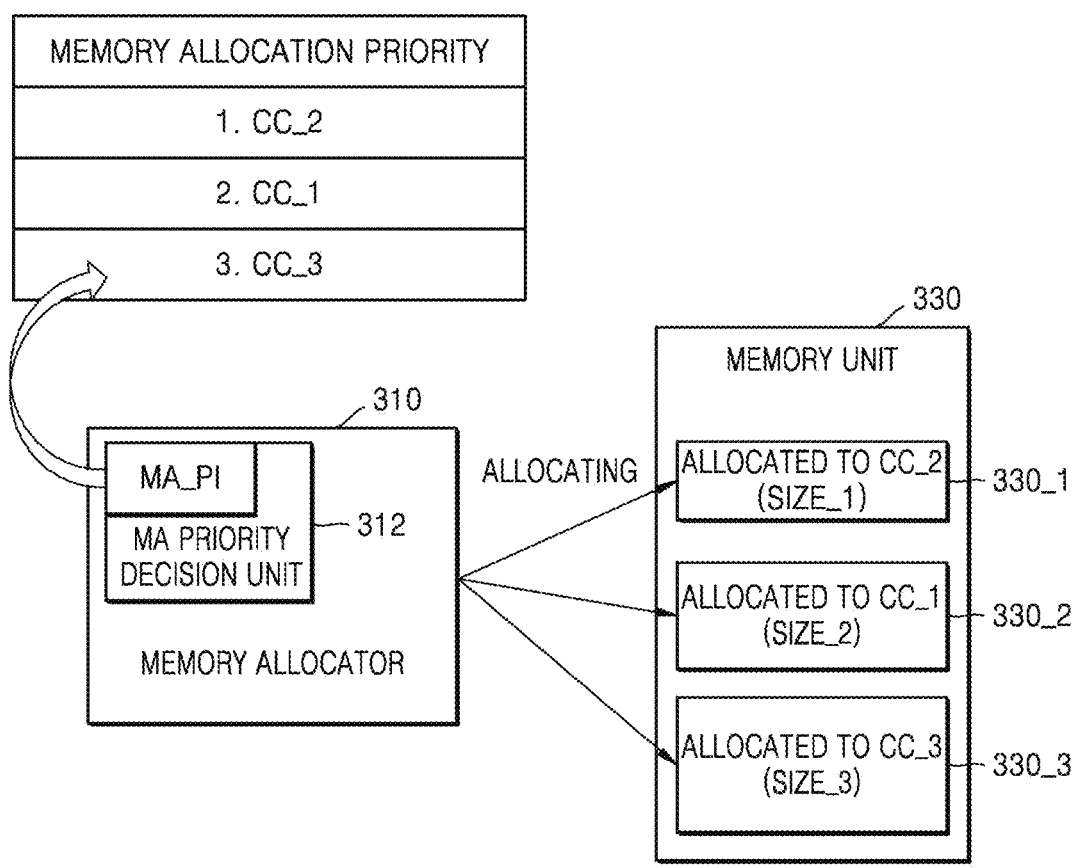
FIGS. 7A through 7C are diagrams illustrating an example of determining memory allocation priority and demodulation priority for component carriers using the methods described in association with FIGS. 5 and 6, according to some example embodiments.
Figure 7C:
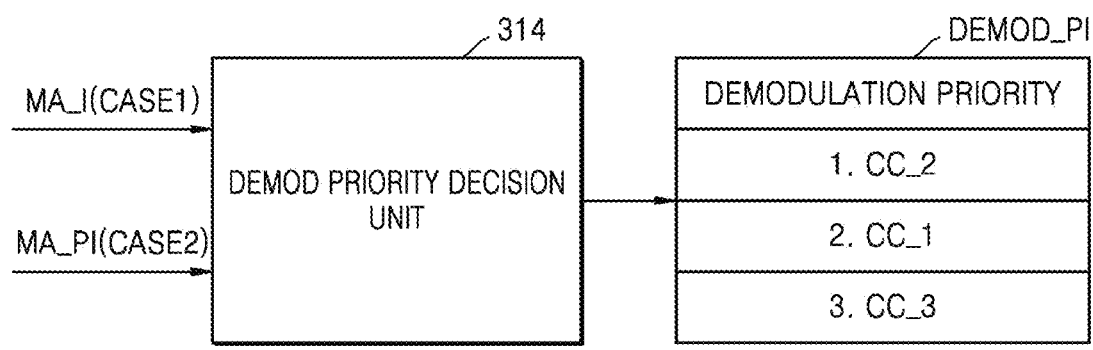

FIGS. 7A through 7C are diagrams illustrating an example of determining the memory allocation priority and the demodulation priority information DEMOD_PI for component carriers using the methods described in association with FIGS. 5 and 6, according to some example embodiments.

Referring to FIGS. 1A and 7A, the WCD 10a may receive first through third component carriers CC_1 through CC_3 from the base station 20a. The first through third component carriers CC_1 through CC_3 may be synchronized with each other. The WCD 10a may obtain information on the number of reception antennas used for receiving each of the first through third component carriers CC_1 through CC_3 from the control information received via the first through third component carriers CC_1 through CC_3 (hereinafter, referred to as reception antenna number information, AT_I). Referring to the AT_I, the first component carrier CC_1 signals may be received by using L reception antennas among the plurality of reception antennas 210a_1 through 210a_t, the second component carrier CC_2 signal may be received by using M reception antennas among the plurality of reception antennas 210a_1 through 210a_t, and the third component carrier CC_3 signal may be received by using K reception antennas among the plurality of reception antennas 210a_1 through 210a_t. Here, it is assumed that M, L, and K have a magnitude relation of M>L>K.

Referring to FIG. 7B, the MA priority decision unit 312 of memory allocator 310 may determine the memory allocation priority for the first through third component carriers CC_1 through CC_3 by using the reception antenna number information AT_I of FIG. 7A, and may generate the memory allocation priority information MA_PI. As shown in FIG. 7A, the number of reception antennas used for receiving the second component carrier CC_2 is M or greatest, the number of reception antennas used for receiving the first component carrier CC_1 is L or next to M, and the number of reception antennas used for receiving the third component carrier CC_3 is K or least. Accordingly, the MA priority decision unit 312 may determine the memory allocation priority in order of the second component carrier CC_2, the first component carrier CC_1, and the third component carrier CC_3. The memory allocator 310 may allocate first to third memories 330_1 through 330_3 of the memory unit 330 to respective component carriers CC_1 through CC_3 based on the memory allocation priority information MA_PI. The memory unit 330 may include the first memory 330_1 having a first size size_1, the second memory 330_2 having a second size size_2, and the third memory 330_3 having a third size size_3. The first memory 330_1, the second memory 330_2, and then, the third memory 330_3 may be enumerated in ascending order of size. The memory allocator 310 may, according to the memory allocation priority, first allocate the second component carrier CC_2 to the first memory 330_1, the first component carrier CC_1 to the second memory 330_2, and then, the third component carrier CC_3 to the third memory 330_3.

Referring to FIG. 7C, the demodulation priority decision unit 314 may determine the demodulation priority for component carriers CC_1 through CC_3 by using the memory allocation information MA_I and generate the demodulation priority information DEMOD_PI. The memory allocation information MA_I may be information indicating sizes of the memories actually allocated to each of the component carriers CC_1 through CC_3 (case 1). The demodulation priority decision unit 314 may refer to the memory allocation information MA_I and determine that the component carrier having a smaller size of an allocated memory has higher demodulation priority. Accordingly, the demodulation priority decision unit 314 may determine the demodulation priority in order of the second component carrier CC_2, the first component carrier CC_1, and the third component carrier CC_3. However, when memories are not allocated to component carriers CC_1 through CC_3 according to the memory allocation priority (for example, when component carriers having different memory allocation priority are allocated to memories of the same size, case 2), the demodulation priority decision unit 314 may determine the demodulation priority of the component carriers CC_1 through CC_3 by using the memory allocation priority information MA_PI.

Figure 8:
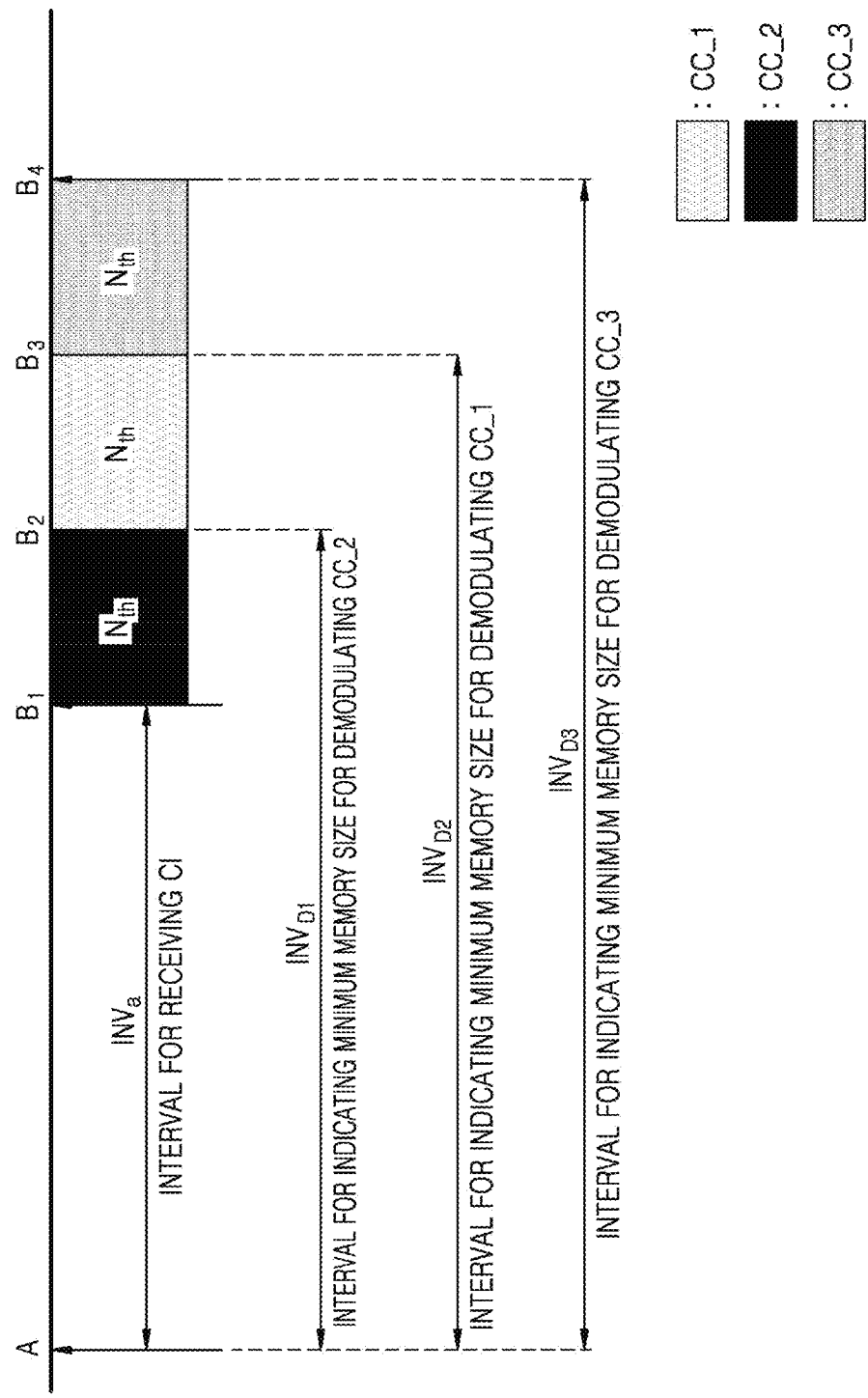
FIG. 8 is a diagram for explaining a demodulation operation of the wireless communication device in FIG. 1A.

FIG. 8 is a diagram for explaining a demodulation operation of the WCD 10a of FIG. 1A. Hereinafter, FIG. 8 will be described based on descriptions given with reference to FIGS. 7A through 7C.

Referring to FIGS. 1A and 8, the WCD 10a may start, at timing A, an operation of receiving $N^{th}$ TTI received signals via the first through third component carriers CC_1 through CC_3 from the base station 20a and storing (or buffering) them to respective allocated memories. It may be possible to obtain the control information CI used for demodulating the received signals during an interval $INV_a$ between the timing A and timing $B_1$. When the EPDCCH is located in a sub-frame as shown in FIG. 3A, the interval $INV_a$ for obtaining the control information CI may exceed one TTI. However, when the PDCCH is located in the sub-frame described in FIG. 3B, the interval $INV_a$ for obtaining the control information CI may be further reduced.

Thereafter, the demodulator 120a may, according to the demodulation priority determined in FIG. 7C, first demodulate a received signal of the second component carrier CC_2, and then, may demodulate a received signal of the third component carrier CC_3 after having demodulated a received signal of the first component carrier CC_1. The demodulator 120a may start the demodulation of the $N^{th}$ TTI received signals of the second component carrier CC_2 at the timing $B_1$ and complete the demodulation at timing $B_2$, and a first interval $INV_{D1}$ may indicate a minimum memory size used for demodulating the received signal of the second component carrier CC_2. The demodulator 120a may start the demodulation of the Nth TTI received signals of the first component carrier CC_1 at the timing $B_2$ and complete the demodulation at timing $B_3$, and a second interval $INV_{D2}$ may indicate a minimum memory size used for demodulating the received signal of the first component carrier CC_1. In addition, the demodulator 120a may start the demodulation of the $N^{th}$ TTI received signals of the third component carrier CC_3 at the timing $B_3$ and complete the demodulation at timing $B_4$, and a third interval $INV_{D3}$ may indicate a minimum memory size used for demodulating the received signal of the third component carrier CC_3.

As described above, the WCD 10a according to some example embodiments may have an effect of efficiently using memories by performing the demodulation operation selectively on the component carrier to which a smaller-sized memory is allocated.

Figure 9:
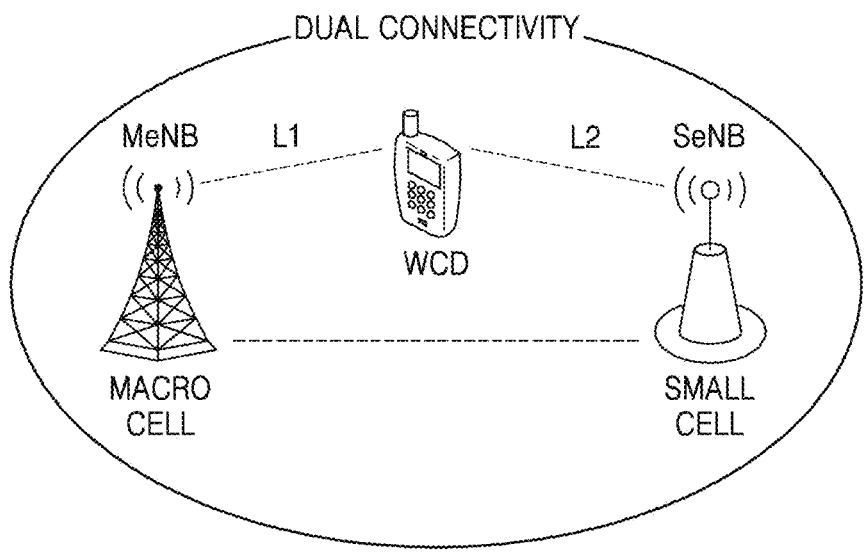
FIG. 9 is a diagram for explaining operation of a wireless communication device in a dual connectivity environment, according to some example embodiments.

FIG. 9 is a diagram for explaining operation of a wireless communication device in a dual connectivity environment, according to some example embodiments.

FIG. 9 shows an example of the dual connectivity between a macro cell MeNB and a small cell SeNB. Referring to FIG. 9, the eNB serving as a macro cell may be referred to as the MeNB in the dual connectivity and the eNB serving as a small cell may be referred to as the SeNB in the dual connectivity. The MeNB may be configured to transmit, to a WCD, different types of traffic signals such as voice over internet protocol (VoIP), streaming data, and signaling data in the dual connectivity. The SeNB may provide additional radio resources to the WCD and in general, be configured to transmit specifically best effort (BE) traffic signals. When the WCD communicates in a dual connectivity environment, the MeNB and the SeNB may not be synchronized with each other because they do not recognize individual timing of signal transmission/reception. Accordingly, the component carriers received by the WCD from the MeNB via a first link L1 and the component carriers received by the WCD from the SeNB via a second link L2 may be out of synchronization with each other. In other words, it may be assumed that a transmission timing difference between the MeNB and the SeNB occurs, and that synchronization occurs when the transmission timing difference is less than a certain time. In addition, synchronization between device to device (D2D) component carriers may be inconsistent with each other even during D2D communication between several WCDs. However, an operation of the WCD may not be limited thereto and the WCD may properly operate, according to communication environment, even in a case where synchronization between the component carriers is inconsistent with each other.

In some example embodiments, when the synchronization between the component carriers is inconsistent with each other, the WCD may divide the component carriers having the same synchronization into one component carrier group and perform an operation based on this scheme. In other words, the WCD may determine the memory allocation priority among component carrier groups and perform a memory allocation operation based on the memory allocation priority among the component carrier groups. Details of this issue will be described below.

Figure 10:
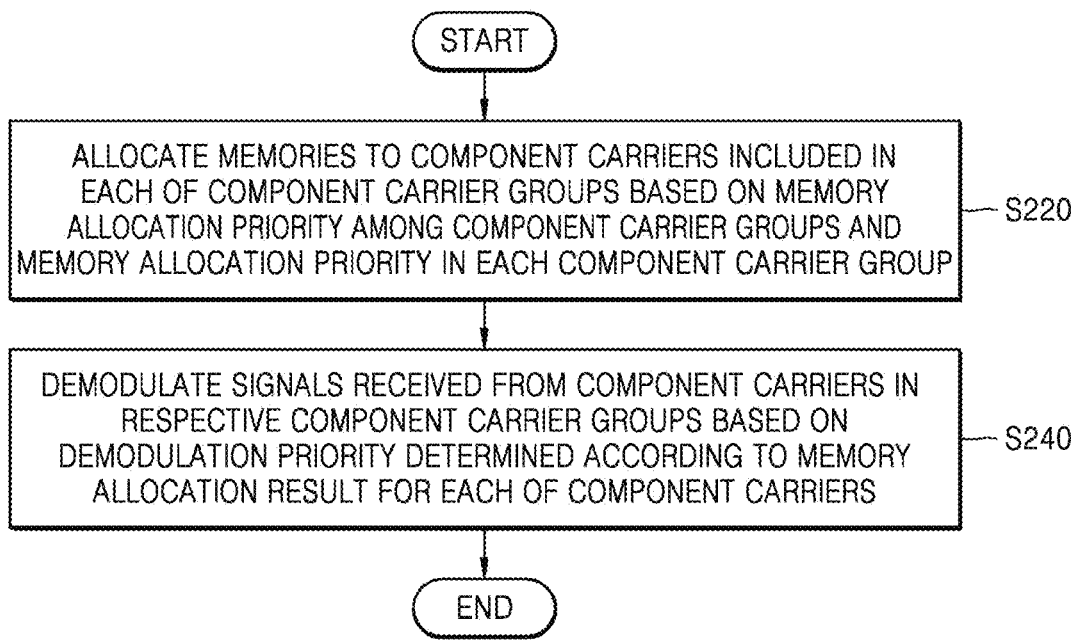
FIG. 10 is a flowchart for explaining a method of operating the wireless communication device in FIG. 1A when there are un-synchronized component carriers in carrier aggregation.

FIG. 10 is a flowchart for explaining a method of operating a wireless communication device (e.g., the WCD 10a of FIG. 1A) when there are un-synchronized component carriers in the carrier aggregation.

Referring to FIG. 10, the WCD 10a may allocate memories to the component carriers included in each of the component carrier groups based on the memory allocation priority among the component carrier groups, each component carrier group including synchronized component carriers, and the memory allocation priority within each component carrier group (S220). The WCD 10a may demodulate the signals received from the component carriers in respective component carrier groups based on the demodulation priority determined according to a memory allocation result for each of the component carriers (S240).

Figure 11A:
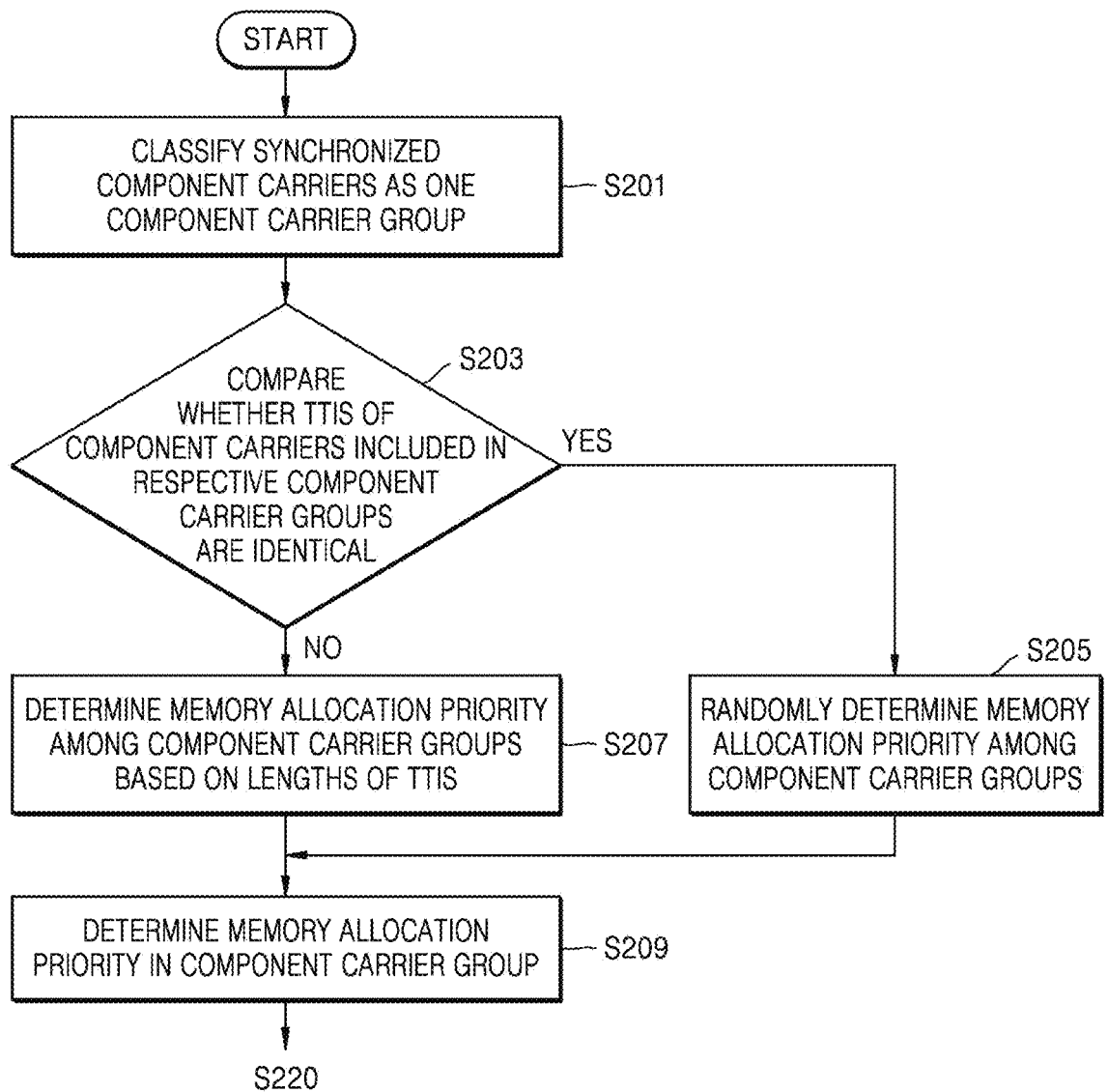
FIGS. 11A and 11B are flowcharts for describing the operations of FIG. 10 in further detail.
Figure 11B:
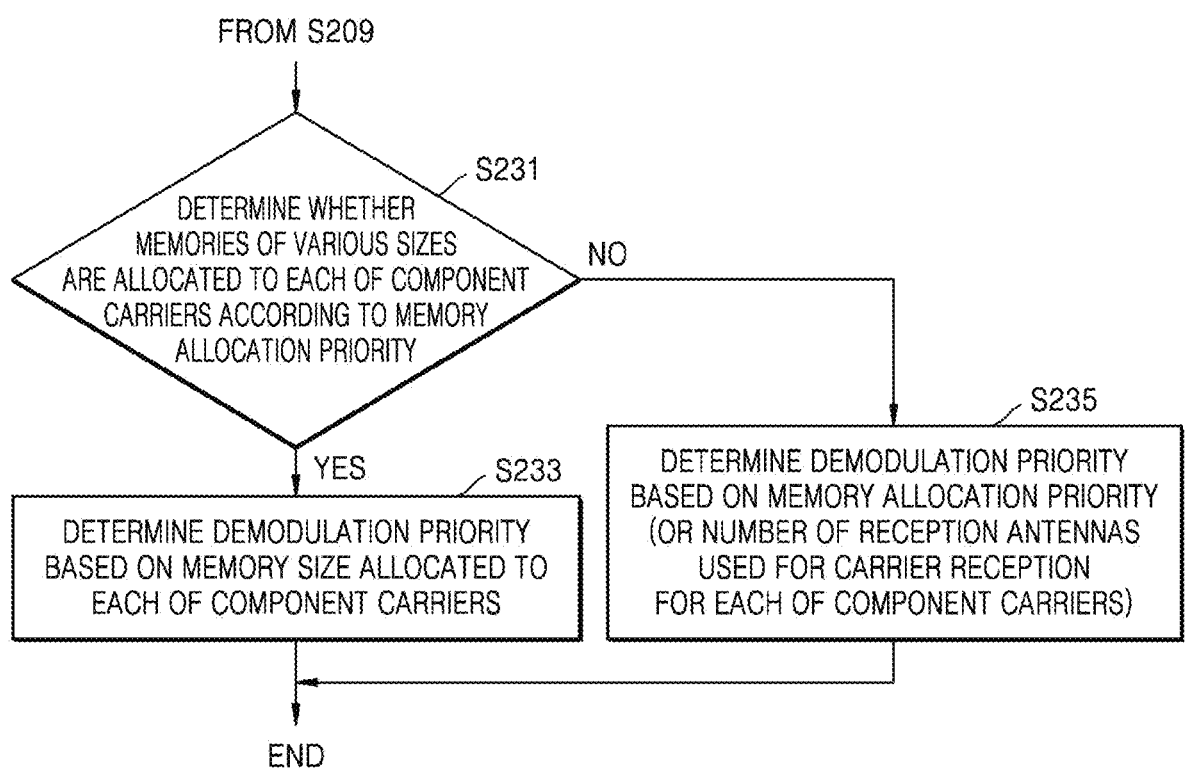

FIGS. 11A and 11B are flowcharts for describing the operations of FIG. 10 in further detail.

Referring to FIG. 11A, the WCD 10a may classify synchronized component carriers as one component carrier group (S201). For example, in the case of dual connectivity as shown in FIG. 9, the WCD 10a may classify component carriers received via the first link L1 as a first component carrier group and component carriers received via the second link as a second component carrier group, depending on whether component carriers are synchronized with each other. The WCD 10a may compare whether the TTIs of the component carriers included in respective component carrier groups are the same (S203). In other words, the WCD in FIG. 9 may compare the TTIs of the component carriers of the first component carrier group with the TTIs of the component carriers of the second component carrier group and determine whether the TTIs are the same. As a result, when the TTIs are the same (YES in S203), the WCD 10a may randomly determine the memory allocation priority among component carrier groups (S205). When the TTIs are not the same (NO in S203), the WCD 10a may determine the memory allocation priority among the component carrier groups based on lengths of the TTIs (S207). For example, the WCD 10a may determine the memory allocation priority to be higher for the component carrier group including a component carrier having less TTI. Accordingly, the WCD 10a may selectively allocate memories to the component carrier group including the component carrier having least TTI. Next, the WCD 10a may determine the memory allocation priority in the component carrier group (S209). As described above, the WCD 10a may determine the memory allocation priority for the component carriers within each component carrier group based on the number of the reception antennas used for carrier reception.

Referring to FIG. 11B, after operation S209, the WCD 10a may determine whether memories of various sizes are allocated to each of the component carriers according to the memory allocation priority in order to determine the demodulation priority (S231). In other words, the WCD 10a may not actually perform the memory allocation according to the memory allocation priority determined in FIG. 11A (also referred to as the memory allocation priority), depending on various communication environments, state of the memories, or the like. Accordingly, the WCD 10a may identify whether the memories are actually allocated according to the memory allocation priority among the component carrier groups and the memory allocation priority within each component carrier group. When the memory allocation is actually performed according to the memory allocation priority (YES in S231), the WCD 10a may determine the demodulation priority based on the memory size allocated to each of the component carriers (S233). When the memory allocation is not performed according to the memory allocation priority (for example, when memories of the same size are allocated even if the memory allocation priority for component carriers is different from each other (No in S231)), the WCD 10a may determine the demodulation priority based on the memory allocation priority (or the number of reception antennas used for carrier reception for each of the component carriers) (S235).

FIGS. 12A to 12D are block diagrams illustrating an example in which a wireless communication device (e.g., the WCD 10a of FIG. 1A) operates in an environment where signals are received from un-synchronized component carriers.

Figures 12A, 12B:
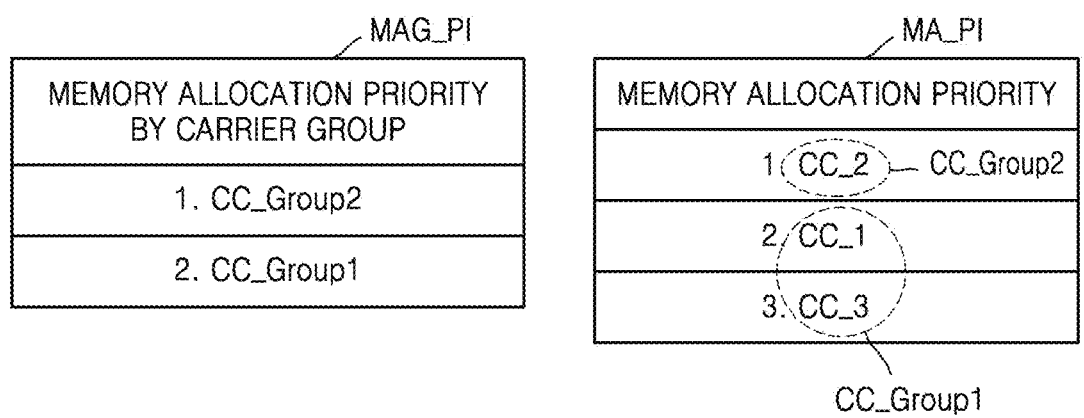
FIGS. 12A to 12D are block diagrams illustrating an example in which a wireless communication device operates in an environment where signals are received from un-synchronized component carriers.

Referring to FIGS. 1A and 12A, the WCD 10a may receive the first through third component carriers CC_1 through CC_3. It is assumed that the first and third component carriers CC_1 and CC_3 are synchronized with each other and the second component carrier CC_2 is not synchronized with the first and third component carriers CC_1 and CC_3. The WCD 10a may obtain such synchronization information from the control information received via the first through third component carriers CC_1 through CC_3. The WCD 10a may classify the first and third component carriers CC_1 and CC_3 having the same synchronization as the first component carrier group CC_Group1, and the second component carrier CC_2 as the second component carrier group CC_Group2. The WCD 10a may obtain information on a number of reception antennas AT_I' indicating the number of reception antennas to be used for receiving each of the first through third component carriers CC_1 through CC_3 from the control information received via the first through third component carriers CC_1 through CC_3. Referring to the AT_I', the first component carrier CC_1 may be received by using M reception antennas among the plurality of reception antennas 210a_1 through 210a_t, the third component carrier CC_3 may be received by using L reception antennas among the plurality of reception antennas 210a_1 through 210a_t, and the second component carrier CC_2 may be received by using K reception antennas among the plurality of reception antennas 210a_1 through 210a_t. Here, it is assumed that M, L, and K have the magnitude relation of M>L>K.

Referring further to FIGS. 5 and 12B, the MA priority decision unit 312 of the memory allocator 310 may determine the memory allocation priority among the component carrier groups and generates memory allocation priority information among the component carrier groups MAG_PI. The MA priority decision unit 312 may determine the memory allocation priority among the component carrier groups based on TTI lengths of each of the component carrier groups or may randomly determine the memory allocation priority among the component carrier groups. In some example embodiments, the TTI length of each of the component carrier groups may instantaneously change and the TTI length referenced by the MA priority decision unit 312 may correspond to a maximum changeable TTI length in a corresponding component carrier. Hereinafter, it is assumed that the second component carrier group CC_Group2 has a higher memory allocation priority than the first component carrier group CC_Group1. However, some example embodiments are not limited thereto and the memory allocation priority for more component carrier groups than the component carrier groups in FIG. 12B may be determined depending on communication environment.

The MA priority decision unit 312 may determine the memory allocation priority for the first through third component carriers CC_1 through CC_3 by using the AT_I' in FIG. 12A and the memory allocation priority information among the component carrier groups MAG_PI, and may generate the memory allocation priority information MA_PI. Firstly, the MA priority decision unit 312 may determine the memory allocation priority for the second component carrier CC_2 of the second component carrier group CC_Group2 as a first place priority according to the memory allocation priority information among the component carrier groups MAG_PI. Next, when the memory allocation priority of the first and third component carriers CC_1 and CC_3 of the first component carrier group CC_Group1 is determined, the memory allocation priority may be determined based on the AT_I'. For example, the MA priority decision unit 312 may, for the carrier reception, determine the memory allocation priority for the first component carrier CC_1 having the number of reception antennas more than the third component carrier CC_3 as a second place priority, and determine the third component carrier CC_3 as a third place priority.

Figure 12C:
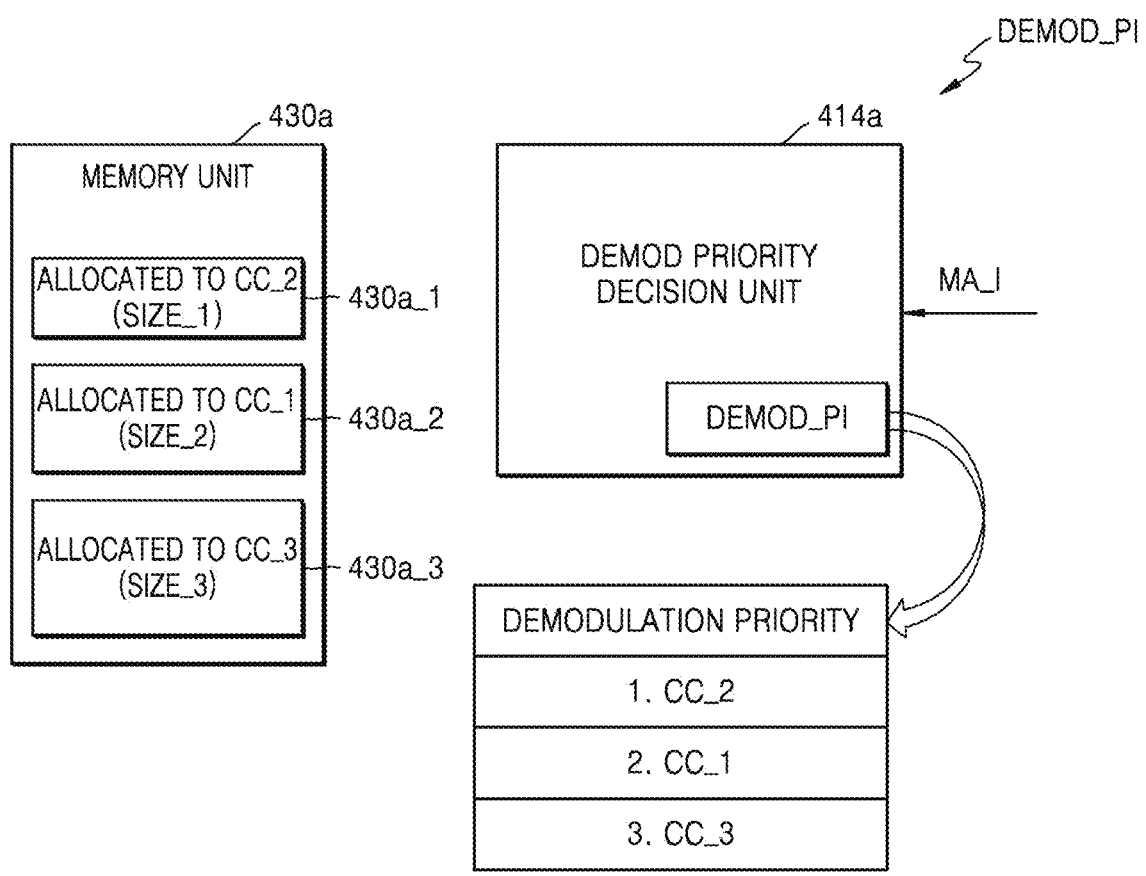

Referring to FIG. 12C, a demodulation priority decision unit 414a may determine the demodulation priority for the component carriers CC_1 through CC_3 by using the memory allocation information MA_I and generate the demodulation priority information DEMOD_PI. The memory allocation information MA_I may be information indicating sizes of memories actually allocated to each of the component carriers CC_1 through CC_3. In FIG. 12C, memories 430a_1 through 430a_3 of a memory unit 430a may have sizes in order from smallest to largest of a first memory 430a_1, a second memory 430a_2, and a third memory 430a_3. It is assumed that the memories 430a_1 through 430a_3 are respectively allocated to the component carriers CC_1 to CC_3 according to the memory allocation priority information MA_PI. The demodulation priority decision unit 414a may refer to the memory allocation information MA_I and determine such that the component carrier having a smaller size of an allocated memory has higher demodulation priority. Accordingly, the demodulation priority decision unit 414a may determine the demodulation priority in order of the second component carrier CC_2, the first component carrier CC_1, and the third component carrier CC_3.

Figure 12D:
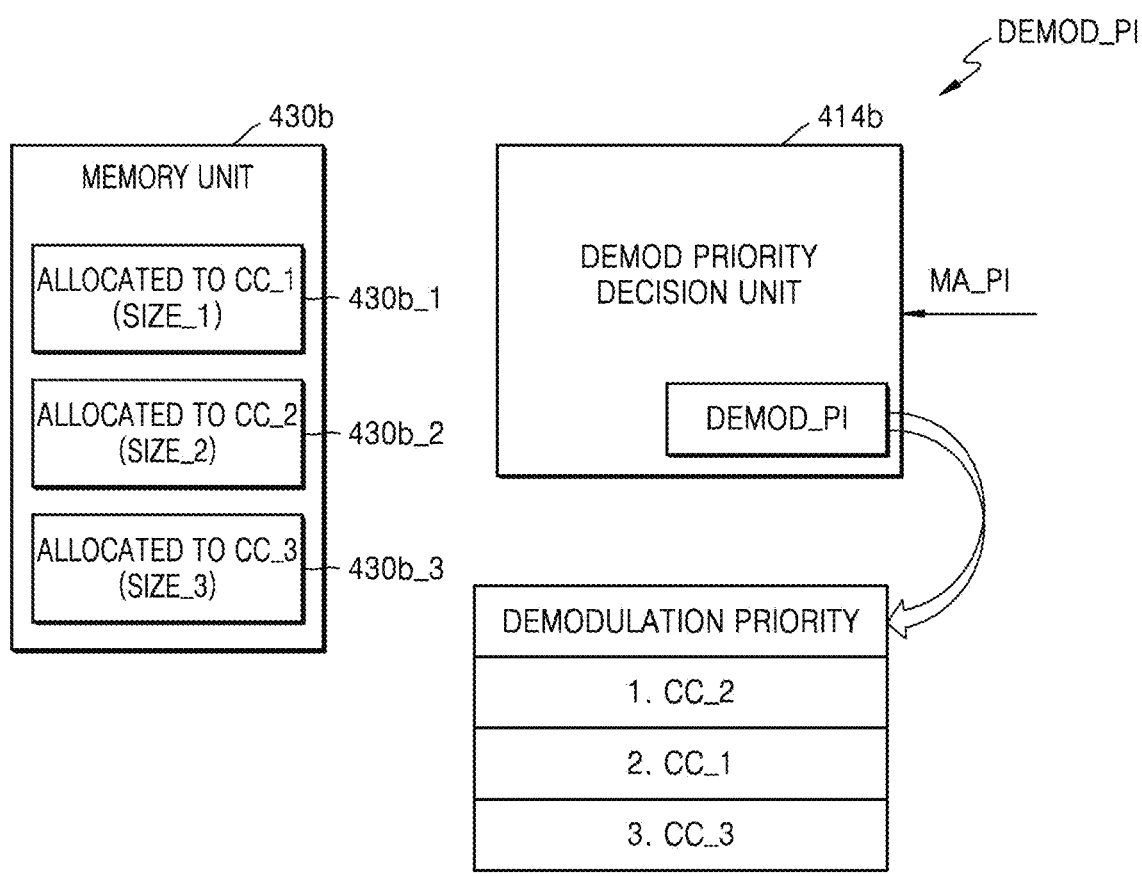

Referring to FIG. 12D, when memories 430b_1 through 430b_3 included in a memory unit 430b have the same size, the component carriers CC_1 through CC_3 having different memory allocation priority may be allocated to the memories 430b_1 through 430b_3 of the same size. At this time, a demodulation priority decision unit 414b may determine the demodulation priority for the component carriers CC_1 through CC_3 by referring to the memory allocation priority information MA_PI in FIG. 12B. For example, the demodulation priority decision unit 414b may determine the demodulation priority in order of the second component carrier CC_2, the first component carrier CC_1, and the third component carrier CC_3 according to the memory allocation priority information MA_PI.

Figure 13A:
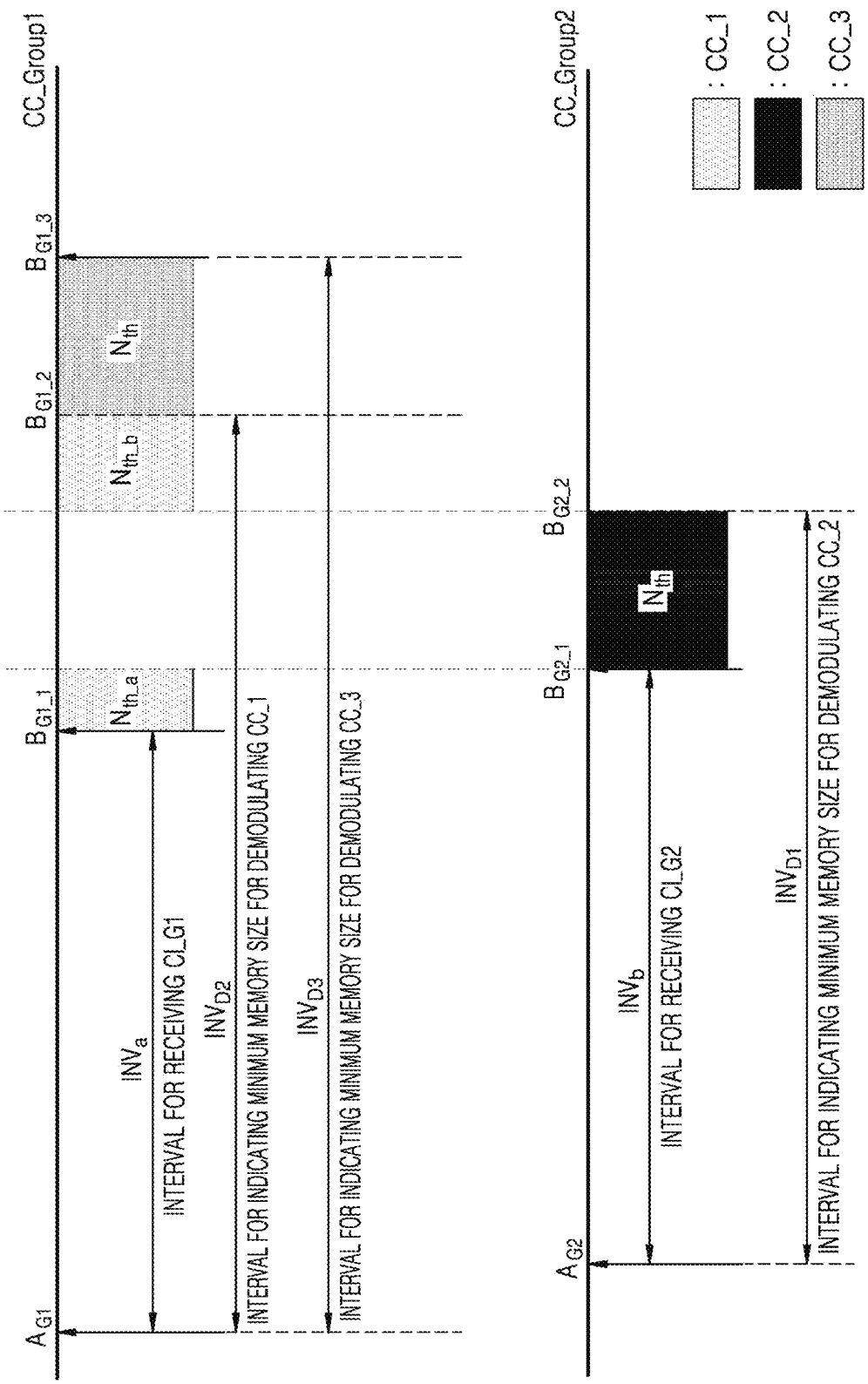
FIGS. 13A and 13C are diagrams for explaining demodulation operation for a first component carrier group and a second component carrier group which are not synchronized.
Figure 13B:
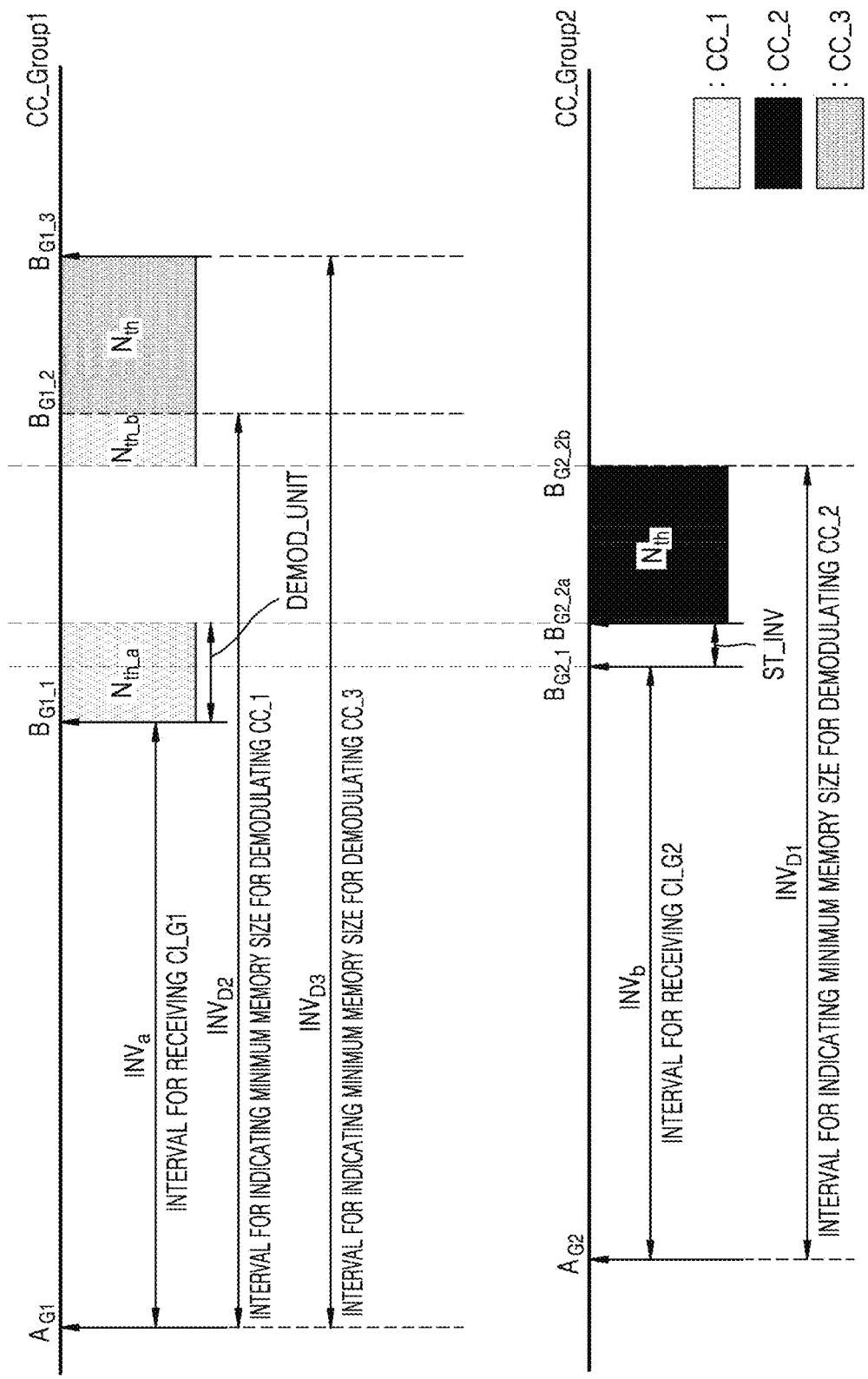
Figure 13C:
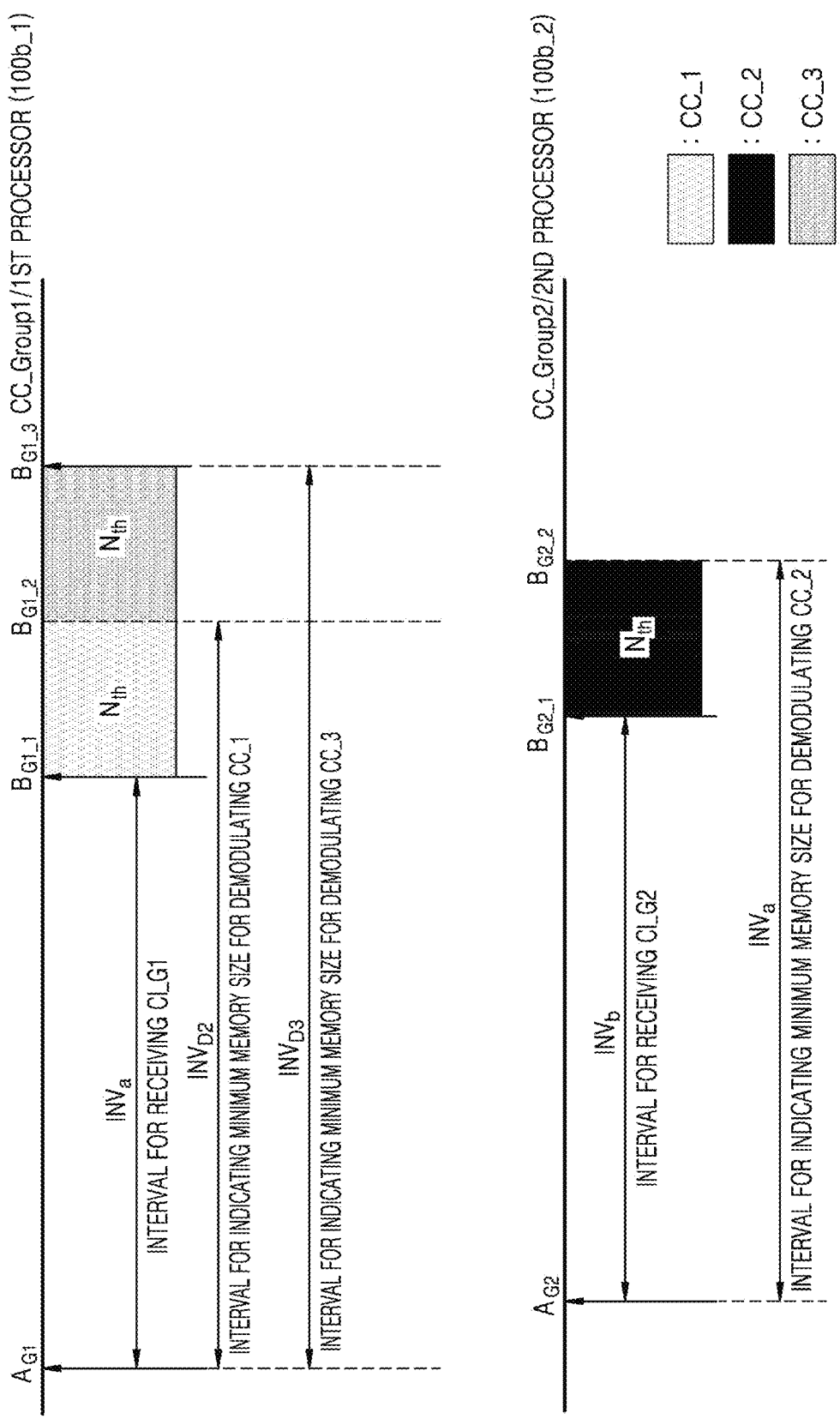

FIGS. 13A and 13C are diagrams for explaining the demodulation operation for the first component carrier group CC_Group1 and the second component carrier group CC_Group2 which are not synchronized. Hereinafter, FIGS. 13A and 13B will be described based on descriptions given with reference to FIGS. 12A through 12D.

Referring to FIGS. 1A and 13A, the WCD 10a may start at timing $A_{G1}$ an operation of firstly receiving $N^{th}$ TTI reception signals from the first and third component carriers CC_1 and CC_3 of the first component carrier group CC_Group1 from the base station 20a, and then storing (or buffering) them in memories allocated to the first and third component carriers CC_1 and CC_3 of the first component carrier group CC_Group1. Next, the WCD 10a may start, at timing $A_{G2}$, an operation of firstly receiving the $N^{th}$ TTI reception signals from the second component carrier CC_2 of the second component carrier group CC_Group2 from the base station 20a, and then, storing (or buffering) them to memories allocated to the second component carrier CC_2 of the second component carrier group CC_Group2. As illustrated in FIG. 13A, the first component carrier group CC_Group1 and the second component carrier group CC_Group2 may not be synchronized with each other. A control information CI_G1 used for demodulating the received signals of the first and third component carriers CC_1 and CC_3 may be obtained during the interval $INV_a$ between the timing $A_{G1}$ and demodulation timing $B_{G1\_1}$. Control information CI_G2 used for demodulating the received signals of the second component carrier CC_2 may be obtained during the interval $INV_b$ between the timing $A_{G2}$ and demodulation timing $B_{G2\_1}$.

As shown in FIG. 12C, the demodulation priority may be in order of the second component carrier CC_2, the first component carrier CC_1, and the third component carrier CC_3. However, since the demodulation timing $B_{G1\_1}$ for the first component carrier CC_1 is ahead of the demodulation timing $B_{G2\_1}$ for the second component carrier CC_2, the WCD 10a may first perform the demodulation operation on the $N^{th}$ TTI received signals of the first component carrier CC_1. Next, the WCD 10a may stop the demodulation operation for the $N^{th}$ TTI received signals of the first component carrier CC_1 at the demodulation timing $B_{G2\_1}$ for the second component carrier CC_2, and start the demodulation operation for the $N^{th}$ TTI received signals of the second component carrier CC_2. The WCD 10a may resume a remaining demodulation operation for the $N^{th}$ TTI received signals of the first component carrier CC_1 at timing $B_{G2\_2}$ at which the demodulation operation for the $N^{th}$ TTI received signals of the second component carrier CC_2 is complete. The WCD 10a may start the demodulation operation for the Nth TTI received signals of the third component carrier CC_3 at timing $B_{G1\_2}$ at which the demodulation operation for the Nth TTI received signals of the first component carrier CC_1 is complete, and may complete the demodulation operation for the $N^{th}$ TTI received signals of the third component carrier CC_3 at timing $B_{G1\_3}$. The first interval $INV_{D1}$ may indicate a minimum memory size used for demodulating the received signal of the second component carrier CC_2. The second interval $INV_{D2}$ may indicate a minimum memory size used for demodulating the received signal of the first component carrier CC_1. The third interval $INV_{D3}$ may indicate a minimum memory size used for demodulating the received signal of the third component carrier CC_3.

As described above, the WCD 10a may first perform the demodulation operation for a received signal of a component carrier when it becomes possible to demodulate the component carrier, but may stop the demodulation operation for the received signal of a component carrier having a low demodulation priority based on the determined demodulation priority, and start the demodulation operation on a received signal of a component carrier having a high demodulation priority. According to some example embodiments, it becomes possible to demodulate a component carrier when all of the control signals used for demodulating the received signal are obtained.

FIG. 13B, unlike FIG. 13A, shows a diagram in which the demodulation operation for the $N^{th}$ TTI received signals of the first component carrier CC_1 is stopped after the demodulation operation of a certain demodulation unit DEMOD_UNIT has been completed, according to some example embodiments.

In other words, the WCD 10a may not immediately stop the demodulation operation for the $N^{th}$ TTI received signals of the first component carrier CC_1 at the timing $B_{G2\_1}$ at which the demodulation operation for the $N^{th}$ TTI received signals of the second component carrier CC_2 is possible, but may start the demodulation operation for the $N^{th}$ TTI received signals of the second component carrier CC_2 at timing $B_{G2\_2a}$ after a standby interval ST_INV has passed during which the demodulation operation of the demodulation unit DEMOD_UNIT is completely performed. The demodulation unit DEMOD_UNIT may be changed depending on the communication environment or a memory state of the WCD 10a. In some example embodiments, the demodulation unit DEMOD_UNIT may be any one of a code-word unit, a code-block unit, a code-word unit, a code-block unit, a resource block pair unit, and a resource element unit. However, some example embodiments are not limited thereto. When a certain control signal (for example, a control signal of the PDCCH) is to be demodulated, the demodulation unit DEMOD_UNIT may be set based on the CCE. Since an interval between the timing $A_{G2}$ and the timing $B_{G2\_2b}$ increases in comparison with the interval between the timing $A_{G2}$ and the timing $B_{G2\_1}$ in FIG. 13A, the minimum memory size used for the demodulation of the received signal of the second component carrier CC_2 may further increase, but there may be an effect that more stable demodulation operation may be performed.

FIG. 13C shows that the received signal of the first component carrier group CC_Group1 is processed by the first processor 100_b1 in FIG. 1B and the received signal of the second component carrier group CC_Group2 is processed by the second processor 100_b2 in FIG. 1B. Referring to FIGS. 1B and 13C, each of the processors 100_b1 and 100_b2 may allocate memories included in each of the memory units 220b_1 and 220b_2 based on the memory allocation priority for the component carriers, and then, may determine the demodulation priority and perform the demodulation operation based on the determined demodulation priority.

Figure 14A:
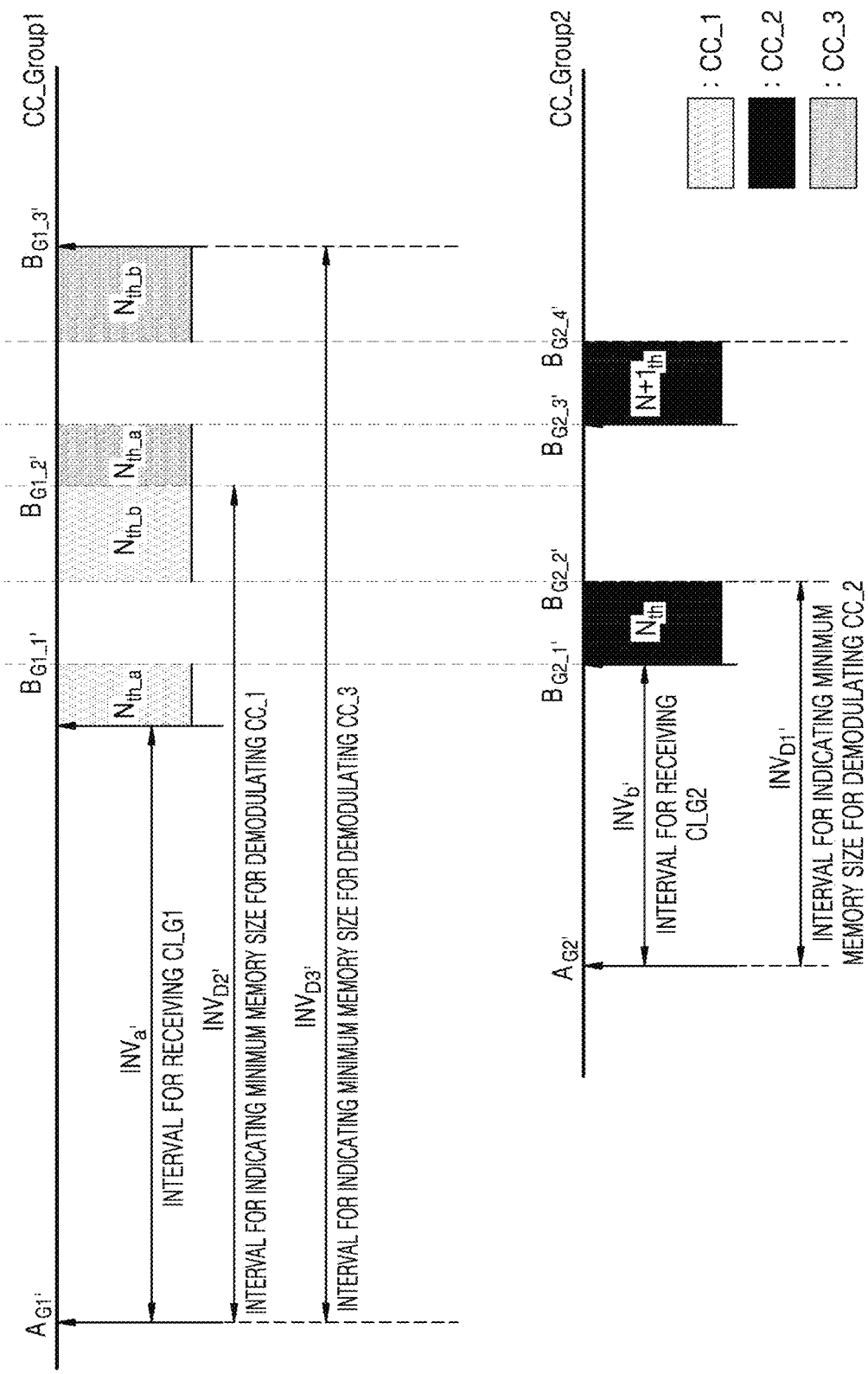
FIGS. 14A and 14B are diagrams for explaining a demodulation operation for the first and second component carrier groups having different synchronization and different transmission time intervals (TTIs)
Figure 14B:
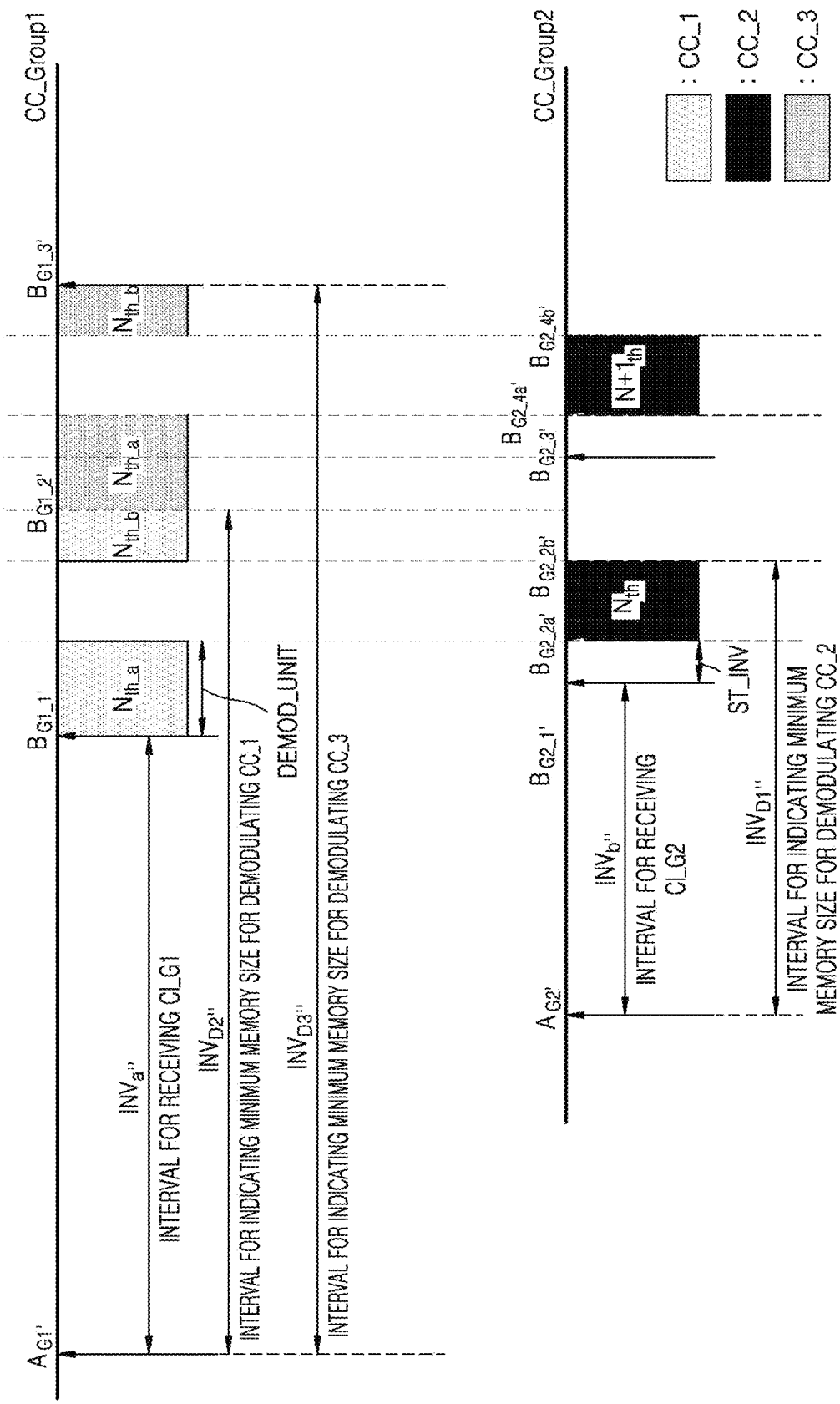

FIGS. 14A and 14B are diagrams for explaining a demodulation operation for the first and second component carrier groups CC_Group1 and CC_Group2 having different synchronization and different TTIs. Hereinafter, FIGS. 14A and 14B will be described based on descriptions given with reference to FIGS. 12A through 12D.

Referring to FIGS. 1A and 14A, the TTI of the second component carrier CC_2 of the second component carrier group CC_Group2 may be less than the TTIs of the first and third component carriers CC_1 and CC_3 of the first component carrier group CC_Group1. Accordingly, as shown in FIG. 12B, the second component carrier group CC_Group2 may have a higher memory allocation priority than the first component carrier group CC_Group1. The WCD 10a may first receive the $N^{th}$ TTI received signals from the first and third component carriers CC_1 and CC_3 of the first component carrier group CC_Group1 from the base station 20a, and start storing (or, buffering) them in memories allocated to each of the first and third component carriers CC_1 and CC_2 at timing $A_{G1'}$. Next, the WCD 10a may start, at timing $A_{G2'}$, an operation of firstly receiving the $N^{th}$ TTI received signals from the second component carrier CC_2 of the second component carrier group CC_Group2 from the base station 20a, and then, storing (or buffering) them to memories allocated to the second component carrier CC_2. The first component carrier group CC_Group1 and the second component carrier group CC_Group2 may have different synchronization and different TTIs from each other. The control information CI_G1 used for demodulating the received signals of the first and third component carriers CC_1 and CC_3 may be obtained during an interval $INV_{a'}$ between the timing $A_{G1'}$ and timing $B_{G1\_1'}$. The control information CI_G2 used for demodulating the received signals of the second component carrier CC_2 may be obtained during an interval $INV_{b'}$ between the timing $A_{G2'}$ and timing $B_{G2\_1'}$.

As shown in FIG. 12C, the demodulation priority is in order of the second component carrier CC_2, the first component carrier CC_1, and the third component carrier CC_3. However, since the demodulation timing $B_{G1\_1'}$ for the first component carrier CC_1 is ahead of demodulation timing $B_{G2\_1'}$ for the second component carrier CC_2, the WCD 10a may first perform the demodulation operation on the $N^{th}$ TTI received signals of the first component carrier CC_1. Next, the WCD 10a may stop the demodulation operation for the $N^{th}$ TTI received signals of the first component carrier CC_1 at the demodulation timing $B_{G2\_1'}$ for the received signal of the second component carrier CC_2, and start the demodulation operation for the $N^{th}$ TTI received signals of the second component carrier CC_2. The WCD 10a may resume a remaining demodulation operation for the $N^{th}$ TTI received signals of the first component carrier CC_1 at timing $B_{G2\_2'}$ at which the demodulation operation for the $N^{th}$ TTI received signals of the second component carrier CC_2 is complete. The WCD 10a may perform the demodulation operation for the $N^{th}$ TTI received signals of the third component carrier CC_3 at the timing $B_{G1\_2'}$ at which the demodulation operation for the $N^{th}$ TTI received signals of the first component carrier CC_1 is complete. Since the demodulation operation for $(N+1)^{th}$ TTI received signals is possible at timing $B_{G2\text{-}3'}$, the WCD 10a may start the demodulation operation for the $(N+1)^{th}$ TTI received signals of the second component carrier CC_2, and at this time, may stop the demodulation operation for the Nth TTI received signals of the third component carrier CC_3. The WCD 10a may resume a remaining demodulation operation for the $N^{th}$ TTI received signals of the third component carrier CC_3 at timing $B_{G2\_4'}$ at which the demodulation operation for the $(N+1)^{th}$ TTI received signals of the second component carrier CC_2 is complete, and may complete the demodulation operation at timing $B_{G1\_3'}$.

A first interval $INV_{D1'}$ may indicate a minimum memory size for demodulating the received signal of the second component carrier CC_2. A second interval $INV_{D2'}$ may indicate a minimum memory size for demodulating the received signal of the first component carrier CC_1. A third interval $INV_{D3'}$ may indicate a minimum memory size for demodulating the received signal of the third component carrier.

FIG. 14B, unlike FIG. 14A, shows a diagram example in which the demodulation operation for the $N^{th}$ TTI received signals of the first component carrier CC_1 is stopped after the demodulation operation of a certain demodulation unit DEMOD_UNIT has been stopped, according to some example embodiments.

In other words, the WCD 10a may not immediately stop the demodulation operation for the $N^{th}$ TTI received signals of the first component carrier CC_1 at the timing $B_{G2\_1'}$ at which the demodulation operation for the $N^{th}$ TTI received signals of the second component carrier CC_2 is possible, but may start the demodulation operation for the $N^{th}$ TTI received signals of the second component carrier CC_2 at timing $B_{G2\_2a'}$ after the standby interval ST_INV has been passed in which the demodulation operation of the demodulation unit DEMOD_UNIT is completely performed. In this manner, the demodulation operation for the $(N+1)^{th}$ TTI received signals of the second component carrier CC_2 may also be performed.

Figure 15:
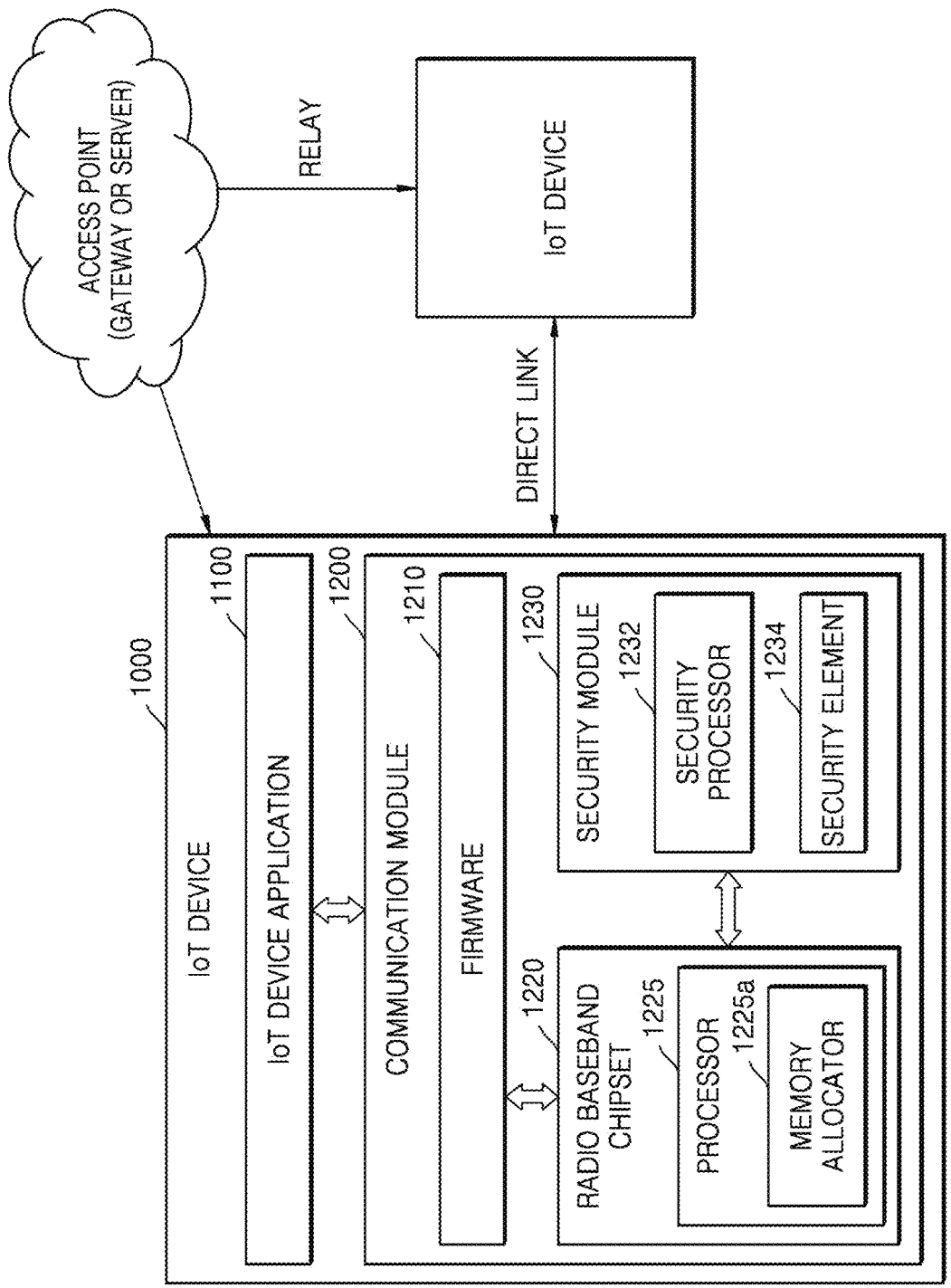
FIG. 15 is a block diagram illustrating an example in which the wireless communication device is an Internet of Things (IoT) device, according to some example embodiments.

FIG. 15 is a block diagram showing an example in which the wireless communication device is an Internet of Things (IoT) device, according to some example embodiments.

The IoT may refer to a network of objects using wired/wireless communication. In addition, an IoT device may have an accessible wired or wireless interface, and may include devices which communicate with at least one or more other devices via a wired/wireless interface to transmit or receive data. As an example, the IoT device may correspond to various types of communicable devices including a refrigerator, an air conditioner, a telephone, an automobile, and the like.

Some example embodiments described above may be applied to the IoT. For example, the above-described base station may be applied to an AP, a gateway, a server, and the like in the IoT. In addition, the above-described WCDs may correspond to the IoT devices. Any one of the IoT devices may communicate with another IoT device via the AP, the gateway, and the like, or may perform device-to-device (D2D) communication between devices according to some example embodiments.

Referring to FIG. 15, the IoT device 1000 may include an IoT device application 1100 and a communication module 1200. The communication module 1200 may include a firmware 1210, a radio baseband chipset 1220, a security module 1230, and the like.

The IoT device application 1100, as a software component, may control the communication module 1200 and may be stored in a memory and executed by a central processing unit (CPU) (not shown) in the IoT device. The communication module 1200 may refer to a wireless communication component that may be connected to or exchange data with a local area network (LAN), wireless LAN (WLAN) such as wireless-fidelity (Wi-Fi), wireless universal serial bus (USB), Zigbee, or mobile communication network.

The firmware 1210 may provide an API (Application Programming Interface) to the IoT device application 1100 and may control the radio baseband chipset 1220 under the control of the IoT device application 1100. The radio baseband chipset 1220 may provide connectivity to the wireless communication network. The radio baseband chipset 1220 may include a processor 1225 as shown in FIG. 1A or the like. The processor 1225 may include a MA 1225a that allocates memories to respective component carriers based on the memory allocation priority, and a demodulator (not shown) for performing the demodulation operation for signals of the component carriers based on the demodulation priority. As described in FIG. 1A or the like, in some example embodiments, the MA 1225a may determine the memory allocation priority based on the number of reception antennas used for receiving component carriers, and may determine the demodulation priority based on a result of the memory allocation. In addition, when synchronization between the component carriers is inconsistent, the MA 1225a may classify the component carriers having the same synchronization as one component carrier group and determine the memory allocation priority among the component carrier groups, and based on a result thereof, perform the memory allocation and the demodulation operation and enable efficient memory usage, thereby reducing a memory size used for communication operations.

The security module 1230 may include a security processor 1232 and a security element 1234. The security module 1230 may authenticate the IoT device to access a wireless communication network and authenticate the IoT device for access to a wireless network service.

While some example embodiments have been particularly shown and described, it will be understood by one of ordinary skill in the art that various changes in form and details may be made therein without departing from the spirit and scope of the following claims.

While some example embodiments have been particularly shown and described, it will be understood that various changes in form and details may be made therein without departing from the spirit and scope of the following claims.

What is claimed is:

1. A wireless communication device comprising:
    a plurality of reception antennas receiving reception signals from a plurality of component carriers;
    memories respectively allocated to the component carriers, the memories having at least two types of sizes; and
    a data processor configured to process the reception signals by using the memories respectively allocated to the component carriers,
    wherein the data processor is further configured to determine demodulation priority for the component carriers based on any one of a size of each of the memories respectively allocated to the component carriers and memory allocation priority and demodulate the reception signals based on the demodulation priority.

2. The wireless communication device of claim 1, wherein the plurality of component carriers have the same transmission time intervals (TTIs) and are synchronized with each other.

3. The wireless communication device of claim 1, wherein the data processor is further configured to select and allocate any one among the memories to each of the component carriers based on the memory allocation priority.

4. The wireless communication device of claim 1, wherein the data processor is further configured to determine the memory allocation priority based on a number of reception antennas used for carrier reception for each of the component carriers.

5. The wireless communication device of claim 1, wherein the data processor is further configured to allocate a smaller size memory to a component carrier having a higher memory allocation priority.

6. The wireless communication device of claim 1, wherein the data processor is further configured to determine the demodulation priority higher for a component carrier having a smaller allocated memory or a component carrier having a higher memory allocation priority.

7. The wireless communication device of claim 1, wherein, with respect to first and second component carriers different in the memory allocation priority among the component carriers, the data processor is further configured to determine demodulation priority of reception signals received from the first and second component carriers based on sizes of memories respectively allocated to the first and the second component carriers when the sizes of the memories respectively allocated to the first and second component carriers are different from each other.

8. The wireless communication device of claim 1, wherein, with respect to first and second component carriers different in the memory allocation priority among the component carriers, the data processor is further configured to determine demodulation priority of reception signals received from the first and second component carriers based on the memory allocation priority when sizes of memories respectively allocated to the first and second component carriers are equal to each other.

9. The wireless communication device of claim 1, wherein the data processor is further configured to demodulate, in a first in, first out (FIFO) manner, reception signals received from component carriers having the same demodulation priority.

10. A method of operating a wireless communication device supporting carrier aggregation, the method comprising:
    determining memory allocation priority for a plurality of component carriers based on a number of reception antennas used for carrier reception for each of the plurality of component carriers;
    allocating memories to the component carriers, respectively, based on the memory allocation priority;
    storing signals received via the component carriers in the memories respectively allocated to the component carriers; and
    demodulating the received signals in a predetermined order based on sizes of the memories respectively storing the received signals.

11. The method of claim 10, wherein the determining of the memory allocation priority comprises determining the memory allocation priority higher for a component carrier having a greater number of reception antennas used for carrier reception.

12. The method of claim 10, wherein the demodulating comprises demodulating the received signals in ascending order of sizes of the memories respectively storing the received signals.

13. The method of claim 10, wherein the demodulating comprises demodulating, based on the memory allocation priority, signals stored in memories having the same size from among the received signals.

14. A method of operating a wireless communication device supporting carrier aggregation, the method comprising:
    allocating a memory to each of component carriers included in a first component carrier group and each of component carriers included in a second component carrier group based on memory allocation priority among component carrier groups and memory allocation priority in a component carrier group; and
    demodulating signals received via component carriers included in the first component carrier group and component carriers included in the second component carrier group based on demodulation priority determined according to a memory allocation result for each of the component carriers.

15. The method of claim 14, wherein the component carriers included in the first component carrier group are in synchronization with each other, and the component carriers included in the second component carrier group are in synchronization with each other.

16. The method of claim 14, wherein, when a transmission time interval (TTI) of the first component carrier group is the same as a TTI of the second component carrier group, the memory allocation priority among the component carrier groups is randomly determined.

17. The method of claim 14, wherein, when a TTI of the first component carrier group is different from a TTI of the second component carrier group, the memory allocation priority among the component carrier groups is determined based on a length of the TTI.

18. The method of claim 14, wherein the memory allocation priority in the component carrier group is determined per component carrier group.

19. The method of claim 14, wherein, when the first component carrier group comprises a first component carrier and the second component carrier group comprises a second component carrier having a higher demodulation priority than the first component carrier, and
    in the demodulating, when it is possible to perform a demodulation operation for a second reception signal received from the second component carrier while a demodulation operation for a first reception signal received from the first component carrier is performed, the demodulation operation for the first reception signal is stopped and the demodulation operation for the second reception signal is performed.

20. The method of claim 19, wherein, in the demodulating, when it is possible to perform the demodulation operation for the second reception signal while a demodulation operation is performed for an Nth demodulation unit included in the first reception signal, the demodulation operation for the first reception signal is stopped after the demodulation operation for the Nth demodulation unit has been completed, and the demodulation operation for the second reception signal is performed.

* * * * *